US011876309B2

(12) United States Patent
Uchida

(10) Patent No.: US 11,876,309 B2
(45) Date of Patent: Jan. 16, 2024

(54) ANTENNA, WIRELESS COMMUNICATION DEVICE, AND ANTENNA FORMING METHOD

(71) Applicant: NEC Platforms, Ltd., Kawasaki (JP)

(72) Inventor: Jun Uchida, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 263 days.

(21) Appl. No.: 17/289,303

(22) PCT Filed: Sep. 12, 2019

(86) PCT No.: PCT/JP2019/035941
§ 371 (c)(1),
(2) Date: Apr. 28, 2021

(87) PCT Pub. No.: WO2020/100402
PCT Pub. Date: May 22, 2020

(65) Prior Publication Data

US 2021/0408689 A1 Dec. 30, 2021

(30) Foreign Application Priority Data

Nov. 12, 2018 (JP) ................................ 2018-212048

(51) Int. Cl.
*H01Q 9/26* (2006.01)

(52) U.S. Cl.
CPC .................................... *H01Q 9/26* (2013.01)

(58) Field of Classification Search
CPC .. H01Q 1/36; H01Q 9/16; H01Q 9/26; H01Q 9/28; H01Q 9/44; H01Q 19/22; H01Q 19/24
See application file for complete search history.

(56) References Cited

U.S. PATENT DOCUMENTS 6,285,342 B1 * 9/2001 Brady .................... H01Q 23/00 235/491
6,320,550 B1 * 11/2001 Van Voorhies ........ H01Q 11/14 343/866

(Continued)

FOREIGN PATENT DOCUMENTS

CN 1298265 A 6/2001
CN 1925216 A 3/2007

(Continued)

OTHER PUBLICATIONS

Indian Office Action for IN Application No. 202117020701 dated Feb. 23, 2022.

(Continued)

*Primary Examiner* — Jason Crawford

(57) ABSTRACT

Three elements of a first (¼) wavelength element and a second (¼) wavelength element which have a length of (¼) wavelength at an arbitrary frequency designated in advance and a half-wavelength element which has a length of a half-wavelength at the arbitrary frequency are arranged in a three-orthogonal state where those are orthogonal to each other, one end portion of the first (¼) wavelength element is joined to one end portion of the second (¼) wavelength element, another end portion of the second (¼) wavelength element is joined to one end portion of the half-wavelength element, a feeding point for antenna power feeding is arranged in a position in which the one end portion of the first (¼) wavelength element is joined to the one end portion of the second (¼) wavelength element, and an antenna is formed as a one-wavelength twisted Z-shaped three-orthogonal dipole antenna.

3 Claims, 36 Drawing Sheets

ONE-WAVELENGTH TWISTED Z-SHAPED THREE-ORTHOGONAL DIPOLE ANTENNA

(56) References Cited

U.S. PATENT DOCUMENTS

| | | | | |
|---|---|---|---|---|
| 6,573,874 | B1 * | 6/2003 | Saito | H01Q 3/247 343/805 |
| 8,711,040 | B2 | 4/2014 | Barbieri et al. | |
| 10,249,936 | B2 * | 4/2019 | Sayama | H01Q 1/241 |
| 2004/0169612 | A1 * | 9/2004 | Song | H01Q 9/26 343/783 |
| 2010/0019985 | A1 * | 1/2010 | Bashyam | A61N 1/37518 343/873 |
| 2012/0075163 | A1 * | 3/2012 | Nilsson | H01Q 1/2258 343/893 |
| 2015/0130669 | A1 * | 5/2015 | Sonoda | H01Q 9/065 343/702 |
| 2018/0090844 | A1 * | 3/2018 | Suh | H01Q 13/10 |
| 2021/0408689 | A1 * | 12/2021 | Uchida | H01Q 19/24 |

FOREIGN PATENT DOCUMENTS

| | | | | |
|---|---|---|---|---|
| CN | 101884183 | A | | 11/2010 |
| CN | 104919655 | A | | 9/2015 |
| CN | 106688141 | A | | 5/2017 |
| JP | 2001-284961 | A | | 10/2001 |
| JP | 2004-120666 | A | | 4/2004 |
| JP | 2004-194218 | A | | 7/2004 |
| JP | 2004194218 | A | * | 7/2004 |
| JP | 2004-229046 | A | | 8/2004 |
| JP | 2005-072670 | A | | 3/2005 |
| JP | 2005191792 | A | | 7/2005 |
| JP | 2006-033068 | A | | 2/2006 |
| JP | 2016-146564 | A | | 8/2016 |
| JP | 2017139685 | A | | 8/2017 |
| WO | 20000026993 | A1 | | 5/2000 |

OTHER PUBLICATIONS

International Search Report of PCT Application No. PCT/JP2019/035941 dated Nov. 12, 2019.

English translation of Written opinion for PCT Application No. PCT/JP2019/035941 dated Nov. 12, 2019.

CQ HAM Radio Editorial Department. “Handbook of Wire Antenna”, fifth edition, CQ Publishing Co., Ltd., Feb. 15, 1976, pp. 38, 39, 41-46, 53-56.

Chinese Office Action for CN Application No. 201980074314.7 dated Feb. 16, 2023 with English Translation.

* cited by examiner

ONE-WAVELENGTH TWISTED Z-SHAPED THREE-ORTHOGONAL DIPOLE ANTENNA

POLARIZED WAVE AGREEMENT STATE
(PARALLEL ARRANGEMENT)

POLARIZED WAVE DISAGREEMENT STATE
(ORTHOGONAL ARRANGEMENT)

ANTENNA, WIRELESS COMMUNICATION DEVICE, AND ANTENNA FORMING METHOD

This application is a National Stage Entry of PCT/JP2019/035941 filed on Sep. 12, 2019, which claims priority from Japanese Patent Application 2018-212048 filed on Nov. 12, 2018, the contents of all of which are incorporated herein by reference, in their entirety.

TECHNICAL FIELD

The present disclosure relates to an antenna, a wireless communication device, and an antenna forming method, particularly to an antenna, a wireless communication device, and an antenna forming method which use a dipole antenna.

BACKGROUND ART

As for mutual communication between wireless communication devices, it is important that communication is capable of being seamlessly performed between any devices. For example, a wireless master unit or a wireless base station as one example of a wireless communication device is responsible for seamless communication with any wireless slave unit. In order to achieve this, an antenna installed in a wireless communication device is the most important component and thus has to be optimized so as to be capable of seamless communication.

However, it may not be acceptable for users that the price of an antenna becomes expensive for optimization. Technological development is necessary which enables provision of an inexpensive antenna which can exhibit high performance. For example, in "antenna apparatus and wireless communication apparatus" disclosed in Patent Literature 1, although limited to an SSR (Split-Ring-Resonator) antenna, a technological proposal is made that placement of an antenna in a perpendicular direction to a substrate surface can be realized at a low cost.

CITATION LIST

Patent Literature

Patent Literature 1
Japanese Unexamined Patent Application Publication No. 2017-139685

SUMMARY OF INVENTION

Technical Problem

A Wi-Fi (registered trademark) home router (wireless master unit) as one example of a wireless communication device for household use performs wireless communication with various wireless slave units. As wireless slave units, a smartphone, a PC (personal computer), and so forth may be raised. A wireless slave unit usually moves in a house and is used in various postures. In wireless communication between a wireless master unit and a wireless slave unit, it is important that polarized waves of wireless electric waves of both of those agree with each other. In a case where the polarized waves do not agree with each other, the wireless electric wave from the wireless master unit or the wireless slave unit has difficulty in reaching the other wireless communication device, and wireless communication is likely to be disconnected.

FIG. 30A and FIG. 30B are conceptual diagrams respectively illustrating an agreement state and a disagreement state of the polarized waves of wireless electric waves between two common dipole antennas. FIG. 30A illustrates a state where the polarized waves of the wireless electric waves of the two dipole antennas agree with each other, and FIG. 30B illustrates a state where the polarized waves of the wireless electric waves of the two dipole antennas disagree with each other. The polarized wave of the wireless electric wave occurs in the same plane as an antenna element. Consequently, as illustrated in FIG. 30A, in a state where two antennas 11L and 12L are arranged in parallel, the polarized waves of the wireless electric waves in both of the antennas are in the agreement state, and the antennas are capable of mutually receiving the wireless electric waves. However, as illustrated in FIG. 30B, in a state where the two antennas 11L and 12L are orthogonally arranged, the polarized waves of the wireless electric waves in both of the antennas are in the disagreement state, and theoretically the antennas cannot mutually receive the wireless electric waves.

Having said that, as illustrated in FIG. 30B, even in a state where the two antennas 11L and 12L are orthogonally arranged, the polarized waves in the antennas 11L and 12L are actually made not orthogonal due to reflection by a wall or the like, and transmission and reception often become possible in a short distance. However, in a state where the two antennas 11L and 12L are orthogonally arranged, the electric field intensity of the reaching wireless electric wave is low, and communication is likely to be disrupted.

FIG. 31A and FIG. 31B are schematic diagrams illustrating an antenna configuration of a common home router using a dipole antenna in related art. FIG. 31A is a perspective view illustrating an external appearance of a home router 10L, and FIG. 31B is a schematic diagram illustrating an antenna configuration of an internal portion of the home router 10L on a larger scale than FIG. 31A. As illustrated in the perspective view of FIG. 31A, in a housing 18 of the home router 10L, a substrate 13 is mounted perpendicularly to the ground. Furthermore, as illustrated in FIG. 31B, a wireless IC (integrated circuit) 14 is installed on the substrate 13, and the wireless IC 14 is connected with a feeding point 16L of a half-wavelength dipole antenna 15L via a coaxial cable 17. By using the coaxial cable 17, power can be fed from the wireless IC 14 to the feeding point 16L of the half-wavelength dipole antenna 15L while power loss is reduced.

Further, the half-wavelength dipole antenna 15L is arranged in parallel with the plane of the substrate 13 and is mounted perpendicularly to the ground. Consequently, only a polarized wave perpendicular to the ground is output from the half-wavelength dipole antenna 15L. Thus, in a case where an antenna state of the wireless slave unit to be wirelessly connected with the home router 10L changes to a parallel state with the ground and only a polarized wave horizontal to the ground (horizontal polarized wave) is requested, communication with the home router 10L becomes difficult. In other words, as the antenna configuration of the home router 10L for which the posture of the wireless slave unit as the other unit of communication is assumed to change to various states, an antenna which becomes a proper communication state for only a perpendicular polarized wave as illustrated in FIG. 31B may hardly be considered to have an optimal antenna configuration.

Further, FIG. 32A and FIG. 32B are schematic diagrams illustrating a setting state of X axis, Y axis, and Z axis in a case of expressing antenna radiation patterns of the half-wavelength dipole antenna 15L of the home router 10L illustrated in FIG. 31A and FIG. 31B. FIG. 32A is a schematic diagram illustrating a positional relationship on the X, Y, and Z axes among the substrate 13, the wireless IC 14, the half-wavelength dipole antenna 15L, and the coaxial cable 17 of the home router 10L illustrated in FIG. 31A and FIG. 31B, and FIG. 32B is a schematic diagram illustrating a positional relationship among three planes of XZ, YZ, and XY and the half-wavelength dipole antenna 15L for expressing the antenna radiation patterns of the half-wavelength dipole antenna 15L. Note that FIG. 32A and FIG. 32B are diagrams conceptually illustrating the posture of the antenna with respect to the X axis, Y axis, and Z axis and are commonly used for illustrating the antenna radiation patterns in the three planes of XZ, YZ, and XY, which are illustrated in FIG. 33. The antenna radiation patterns can be expressed as FIG. 33 by drawing, as characteristic curves, the electric field intensities of orthogonal polarized waves which are respectively orthogonal to the three planes of XZ, YZ, and XY and of parallel polarized waves which are respectively in parallel with the three planes of XZ, YZ, and XY by referring to FIG. 32A and FIG. 32B.

FIG. 33 is a pattern diagram illustrating the antenna radiation patterns of the half-wavelength dipole antenna 15L of the home router 10L illustrated in FIG. 31A and FIG. 31B and illustrates the respective antenna radiation patterns of the half-wavelength dipole antenna 15L in the XZ plane, YZ plane, and XY plane, the half-wavelength dipole antenna 15L being in the positional relationship illustrated in the schematic diagram of FIG. 32B. Note that in FIG. 33, the characteristic curves of the horizontal polarized wave of the antenna radiation patterns are illustrated by thick lines, and the characteristic curves of a perpendicular polarized wave (vertically polarized wave) are illustrated by thin lines. As illustrated in the pattern diagram of FIG. 33, it may be understood that in the XZ plane and the YZ plane, the polarized waves which are in parallel with those planes, that is, the perpendicular polarized waves are present but no polarized wave which is orthogonal to those planes, that is, no horizontal polarized wave is present. Further, it may be understood that in the XY plane, the polarized wave which is orthogonal to the XY plane, that is, the perpendicular polarized wave is present but no polarized wave which is in parallel with the XY plane, that is, no horizontal polarized wave is present. Consequently, the antenna configuration, of the half-wavelength dipole antenna 15L, illustrated in FIG. 31A and FIG. 31B may hardly be considered to be a configuration which can uniformly output the polarized waves of the wireless electric wave in all directions and perform communication with respect to all directions. As described above, the dipole antenna in related art cannot uniformly output the polarized waves of the wireless electric wave in all directions, and this fact has been left as a problem to be solved for a dipole antenna.

Object of the Present Disclosure

In consideration of the above-described problem of a dipole antenna, an object of the present disclosure is to provide an antenna, a wireless communication device, and an antenna forming method in which a dipole antenna is capable of uniformly outputting polarized waves of a wireless electric wave in all directions.

Solution to Problem

To solve the above-described problem, an antenna, a wireless communication device, and an antenna forming method according to the present disclosure mainly employ the following characteristic configurations.

(1) A first aspect of the present disclosure provides an antenna, in which three elements of a first (1/4) wavelength element and a second (1/4) wavelength element which have a length of (1/4) wavelength at an arbitrary frequency designated in advance and a half-wavelength element which has a length of a half-wavelength at the arbitrary frequency are arranged in a three-orthogonal state where the three elements are orthogonal to each other, one end portion of the first (1/4) wavelength element is joined to one end portion of the second (1/4) wavelength element, another end portion of the second (1/4) wavelength element is joined to one end portion of the half-wavelength element, a feeding point for antenna power feeding is arranged in a position in which the one end portion of the first (1/4) wavelength element is joined to the one end portion of the second (1/4) wavelength element, and the antenna is formed as a one-wavelength twisted Z-shaped three-orthogonal dipole antenna.

(2) A second aspect of the present disclosure provides an antenna, in which three elements of a first half-wavelength element, a second half-wavelength element, and a third half-wavelength element which have a length of a half-wavelength at an arbitrary frequency designated in advance are arranged in a three-orthogonal state where the three elements are orthogonal to each other, one end portion of the first half-wavelength element is joined to one end portion of the second half-wavelength element, another end portion of the second half-wavelength element is joined to one end portion of the third half-wavelength element, a feeding point for antenna power feeding is arranged in a central position of the second half-wavelength element, and the antenna is formed as a 1.5-wavelength twisted Z-shaped three-orthogonal dipole antenna.

(3) A third aspect of the present disclosure provides an antenna, in which three elements of a first element, a second element, and a third element whose total length is a length of a half-wavelength at an arbitrary frequency designated in advance are arranged in a three-orthogonal state where the three elements are orthogonal to each other, lengths of the first element and the third element are set equivalent to each other and are set longer than a length of the second element, one end portion of the first element is joined to one end portion of the second element, another end portion of the second element is joined to one end portion of the third element, a feeding point for antenna power feeding is arranged in a central position of the second element, and the antenna is formed as a half-wavelength twisted Z-shaped three-orthogonal dipole antenna.

(4) A fourth aspect of the present disclosure provides a wireless communication device including a dipole antenna which radiates a wireless electric wave, in which three elements of a first (1/4) wavelength element and a second (1/4) wavelength element which have a length of (1/4) wavelength at an arbitrary frequency designated in advance and a half-wavelength element which has a length of a half-wavelength at the arbitrary frequency are arranged in a three-orthogonal state where the three elements are orthogonal to each other, the three elements configuring the dipole antenna, one end portion of the first (¼) wavelength element is joined to one end portion of the second (¼) wavelength element, another end portion of the second (¼) wavelength element is joined to one end portion of the half-wavelength element, a feeding point for antenna power feeding is arranged in a position in which the one end portion of the first (¼) wavelength element is joined to the one end portion of the second (¼) wavelength element, and the dipole antenna is formed as a one-wavelength twisted Z-shaped three-orthogonal dipole antenna.

(5) A fifth aspect of the present disclosure provides an antenna forming method including:

arranging three elements of a first (¼) wavelength element and a second (¼) wavelength element which have a length of (¼) wavelength at an arbitrary frequency designated in advance and a half-wavelength element which has a length of a half-wavelength at the arbitrary frequency in a three-orthogonal state where the three elements are orthogonal to each other;

joining one end portion of the first (¼) wavelength element to one end portion of the second (¼) wavelength element;

joining another end portion of the second (¼) wavelength element to one end portion of the half-wavelength element;

arranging a feeding point for antenna power feeding in a position in which the one end portion of the first (¼) wavelength element is joined to the one end portion of the second (¼) wavelength element; and forming an antenna as a one-wavelength twisted Z-shaped three-orthogonal dipole antenna.

Advantageous Effects of Invention

An antenna, a wireless communication device, and an antenna forming method of the present disclosure can mainly provide effects described in the following.

That is, three elements configuring a dipole antenna are caused to be in three-orthogonal arrangement, and it thereby becomes possible to realize an improvement in polarized waves of a wireless electric wave, the improvement being very necessary for an improvement in wireless communication performance.

DESCRIPTION OF EMBODIMENTS

Figure 1:
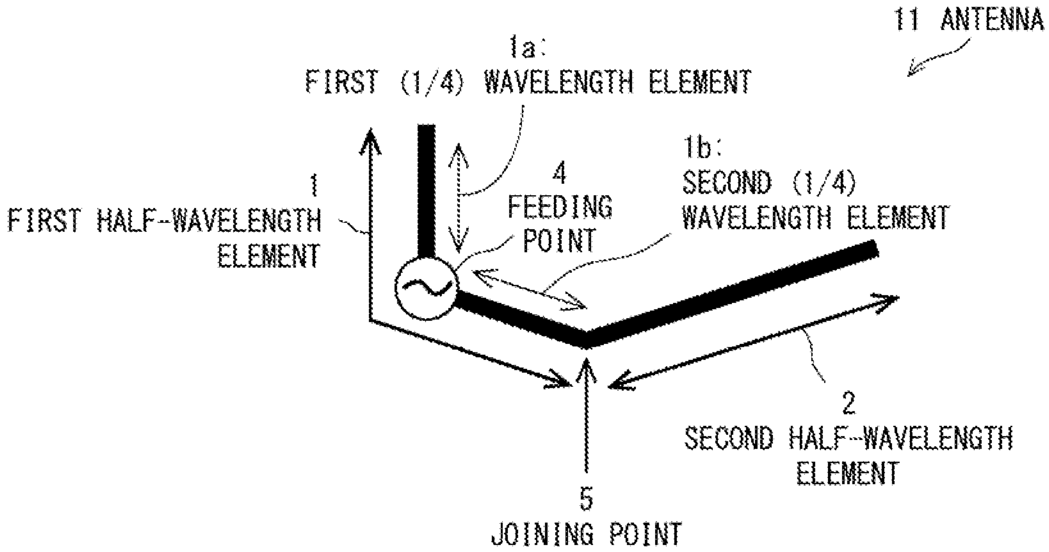
FIG. 1 is a schematic diagram illustrating one example of an antenna configuration of a one-wavelength twisted Z-shaped three-orthogonal dipole antenna as one example of an antenna according to an example embodiment.

Preferable example embodiments of an antenna, a wireless communication device, and an antenna forming method according to the present disclosure will hereinafter be described with reference to the attached drawings. Note that the antenna according to the present disclosure relates to a dipole antenna radiating a wireless electric wave at an arbitrary wavelength, and the wireless communication device according to the present disclosure relates to a wireless communication device in which a dipole antenna is installed. Further, it goes without saying that drawing reference characters given to the following drawings are for convenience added to elements as examples for facilitating understanding and are not intended to limit the present disclosure to forms of the drawings.

Characteristics of Example Embodiment

Prior to descriptions of an example embodiment, outlines of characteristics thereof will first be described. An antenna according to the present example embodiment is mainly characterized in that the antenna is a Z-shaped dipole antenna with a length of 1 wavelength or 1.5 wavelengths and in a Z-shape which is bent at a right angle at each half-wavelength of an arbitrary frequency designated in advance and a feeding point for antenna power feeding is arranged in a portion around the center of any half-wavelength element with a length of a half-wavelength.

The characteristics of the present example embodiment will further be described in the following. In a case of a dipole antenna with a length of one wavelength (hereinafter referred to as "one-wavelength twisted Z-shaped three-orthogonal dipole antenna"), the whole length is set to one wavelength. Further, in a first half-wavelength element and a second half-wavelength element which are formed by performing bending at a right angle at each half-wavelength, bending is performed in the central position of the first half-wavelength element and at a right angle in a twisted direction (that is, in a direction which is orthogonal also to the second half-wavelength element), and a first (¼) wavelength element and a second (¼) wavelength element are thereby further formed.

As a result, a positional relationship is provided in which three elements (that is, the first (¼) wavelength element, the second (¼) wavelength element, and the second half-wavelength element) are orthogonal to each other (that is, three-orthogonal). In addition, a feeding point for antenna power feeding is arranged in a portion around the center of either one of the first half-wavelength element and the second half-wavelength element. Note that it is possible to make end portions of the first half-wavelength element and the second half-wavelength element as joining portions to each other become a non-contact state in a mutually adjacent positional relationship.

Further, in a case of a dipole antenna with a length of 1.5 wavelengths (hereinafter referred to as "1.5-wavelength twisted Z-shaped three-orthogonal dipole antenna"), the whole length is set to 1.5 wavelengths. Furthermore, three half-wavelength elements of a first half-wavelength element, a second half-wavelength element, and a third half-wavelength element which are formed by performing bending at a right angle at each half-wavelength are bent in mutually orthogonal directions and result in a mutually orthogonal (three-orthogonal) positional relationship.

In addition, it is possible to arrange a feeding point for antenna power feeding in a portion around the center of any one of the first half-wavelength element, the second half-wavelength element, and the third half-wavelength element. Note that it is possible to make either one or both pairs of end portions, which are the end portions of the first half-wavelength element and the second half-wavelength element as joining portions to each other and the end portions of the second half-wavelength element and the third half-wavelength element as joining portions to each other, become a non-contact state in a mutually adjacent positional relationship.

Configuration Examples of Present Example Embodiment

Next, examples of an antenna configuration of the antenna according to the present example embodiment will be described with reference to the drawings.

(Antenna Configuration Examples of One-Wavelength Twisted Z-Shaped Three-Orthogonal Dipole Antenna)

First, a description will be made about antenna configuration examples of "one-wavelength twisted Z-shaped three-orthogonal dipole antenna" whose whole length is one wavelength at a frequency defined arbitrarily and in advance. Note that in all of the following descriptions, a description will be made about a case where the antenna is placed in a perpendicular direction to the ground (XY plane). Further, all antenna configurations described as the present example embodiment in the following represent examples which enable planes having no polarized wave of a wireless electric wave to be removed.

FIG. 1 is a schematic diagram illustrating one example of an antenna configuration of the one-wavelength twisted Z-shaped three-orthogonal dipole antenna as one example of the antenna according to the present example embodiment. As illustrated in FIG. 1, an antenna 11 is in a state where respective end portions of a first half-wavelength element 1 and a second half-wavelength element 2 which are formed by performing bending at a right angle at each half-wavelength are joined to and contact with each other in a joining point 5.

In addition, the first half-wavelength element 1 is further bent at a right angle in an orthogonal direction to the second half-wavelength element 2 (that is, further twisted at a right angle) in the central position, that is, the position at a length of (¼) wavelength from each of end portions of both ends and thereby forms a first (¼) wavelength element 1*a* and a second (¼) wavelength element 1*b*. As a result, a positional relationship is provided in which the first (¼) wavelength element 1*a* is orthogonal to each of the second (¼) wavelength element 1*b* and the second half-wavelength element 2.

Consequently, the antenna 11 is in a state where three elements of the first (¼) wavelength element 1*a*, the second (¼) wavelength element 1*b*, and the second half-wavelength element 2 are orthogonal to each other (that is, a three-orthogonal state) and is thereby formed as "one-wavelength twisted Z-shaped three-orthogonal dipole antenna". Forming the state where the three elements are orthogonal to each other (that is, the three-orthogonal state) in such a manner is very important for removing planes having no polarized wave of a wireless electric wave.

Furthermore, in the central position of the first half-wavelength element 1, that is, the position of a joining point between the first (¼) wavelength element 1*a* the second (¼) wavelength element 1*b*, a feeding point 4 for antenna power feeding is arranged where the antenna 11 starts, and power feeding is performed via a coaxial cable or a stripline.

In other words, in the antenna 11 illustrated in FIG. 1, the three elements of the first (¼) wavelength element 1*a* and the second (¼) wavelength element 1*b* which have a length of (¼) wavelength at an arbitrary frequency designated in advance and the second half-wavelength element 2 which has a length of a half-wavelength are arranged in the three-orthogonal state where those are orthogonal to each other. Furthermore, one end portion of the first (¼) wavelength element 1*a* is joined to one end portion of the second (¼) wavelength element 1*b*, and the other end portion of the second (¼) wavelength element 1*b* is joined to one end portion of the second half-wavelength element 2. In addition, the feeding point 4 for antenna power feeding is arranged in a position where the one end portion of the first (¼) wavelength element 1*a* is joined to the one end portion of the second (¼) wavelength element 1*b*, and the "one-wavelength twisted Z-shaped three-orthogonal dipole antenna" is thereby formed.

Figure 2:
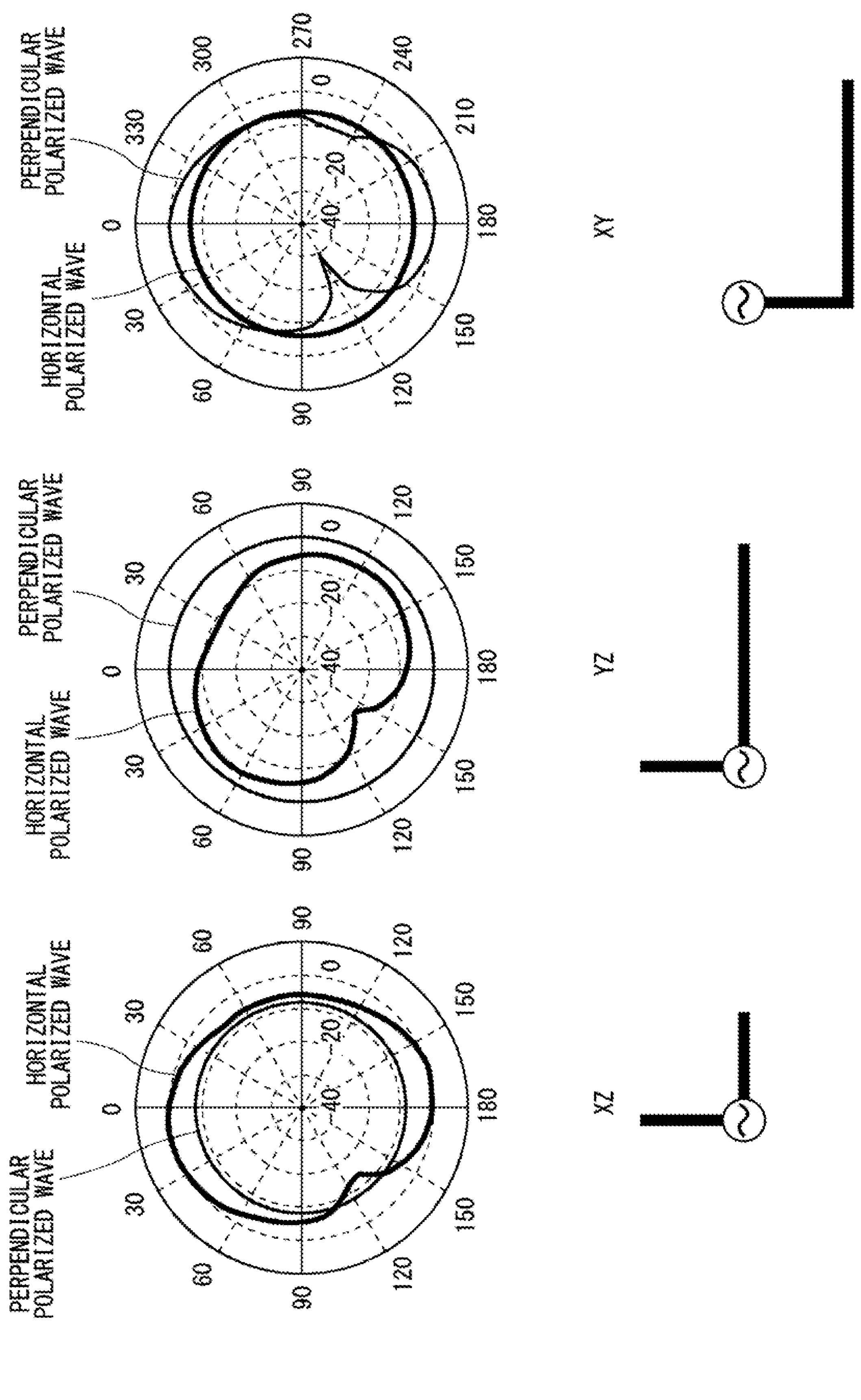
FIG. 2 is a pattern diagram illustrating antenna radiation patterns of the antenna illustrated in FIG. 1.
Figure 33:
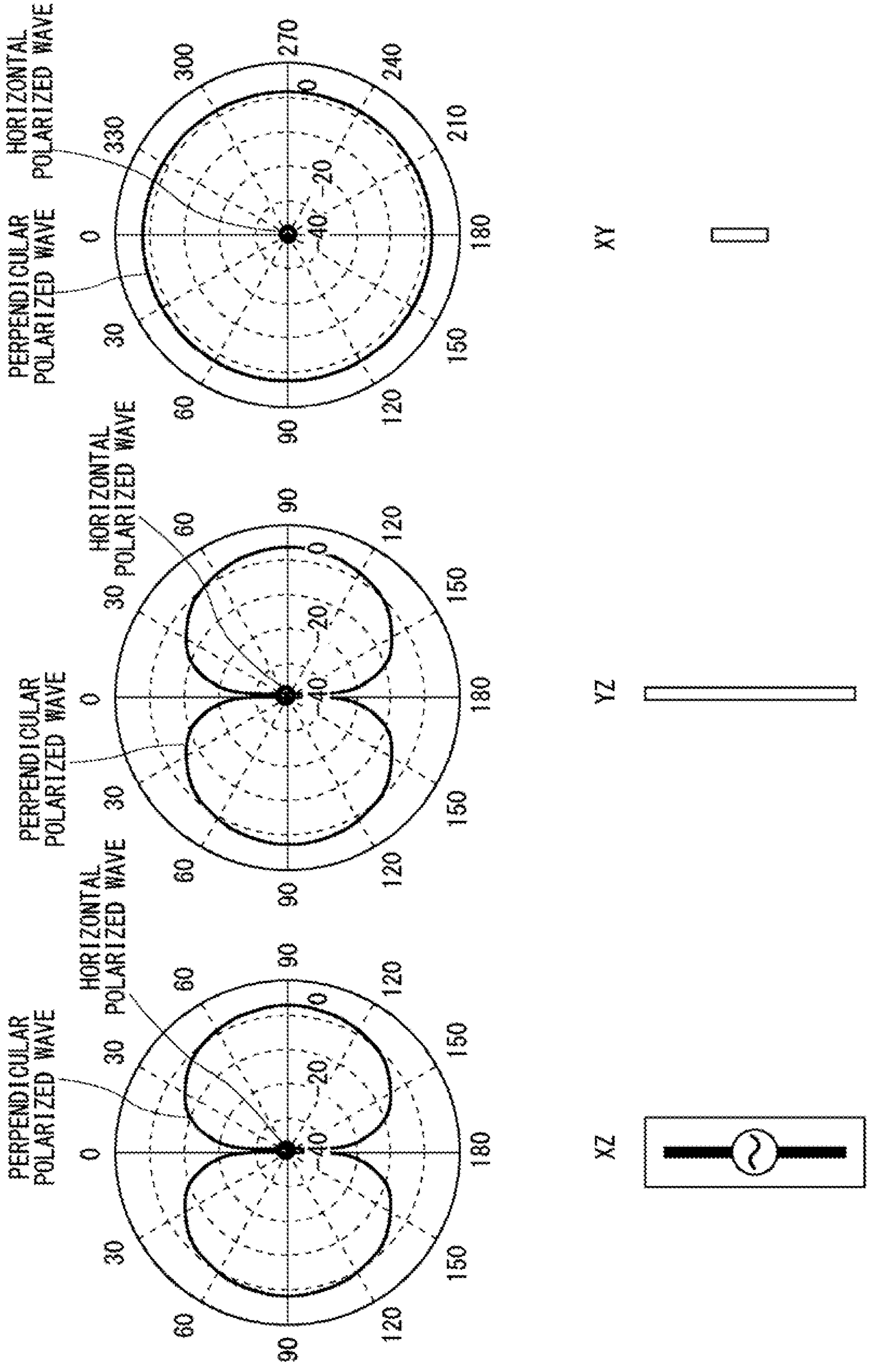
FIG. 33 is a pattern diagram illustrating the antenna radiation patterns of the half-wavelength dipole antenna of the home router illustrated in FIG. 31A and FIG. 31B.

FIG. 2 is a pattern diagram illustrating antenna radiation patterns of the antenna 11 illustrated in FIG. 1 (that is, the one-wavelength twisted Z-shaped three-orthogonal dipole antenna) and illustrates the antenna radiation patterns of the antenna 11 in each of XZ plane, YZ plane, and XY plane. Note that in FIG. 2, characteristic curves of a horizontal polarized wave are illustrated by thick lines, and characteristic curves of a perpendicular polarized wave (vertically polarized wave) are illustrated by thin lines. As illustrated in the pattern diagram of FIG. 2, the polarized waves of a wireless electric wave are present in each plane of the three planes of the XZ plane, YZ plane, and XY plane. It may be understood that differently from the antenna radiation patterns of a half-wavelength dipole antenna 15L illustrated in FIG. 33 as related art, the antenna 11 illustrated in FIG. 1 uniformly emits the wireless electric wave in all directions.

Figure 3:
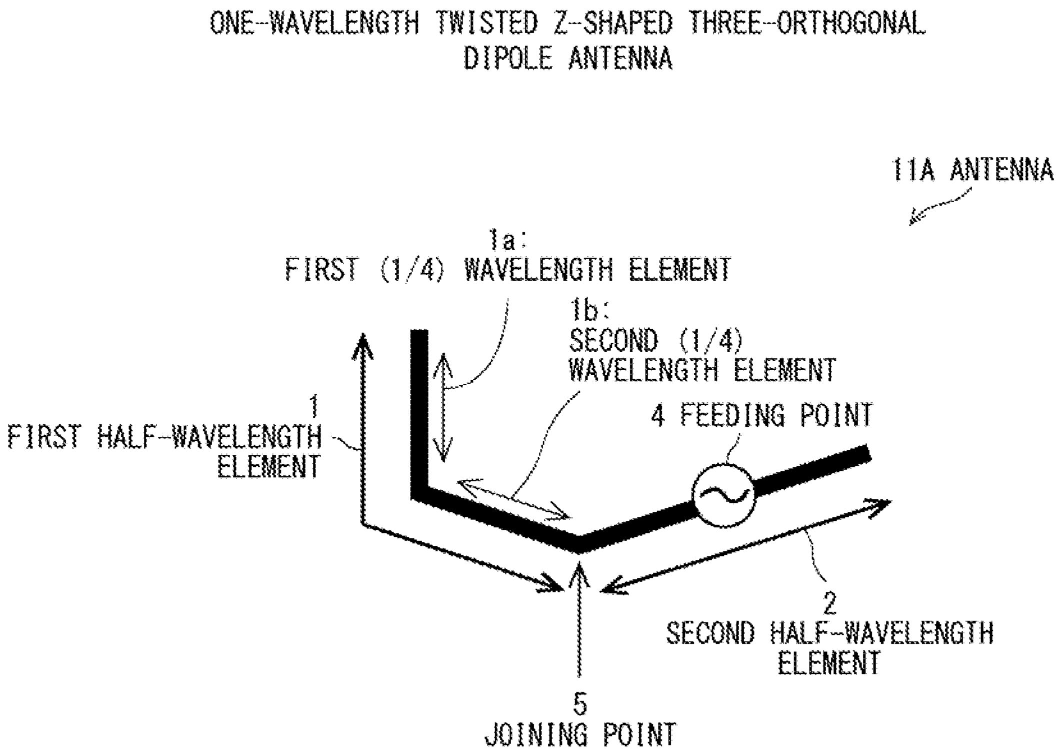
FIG. 3 is a schematic diagram illustrating an antenna configuration example of the one-wavelength twisted Z-shaped three-orthogonal dipole antenna as one example of the antenna according to the example embodiment, the antenna configuration example being different from that of the antenna of FIG. 1.

Next, a description will be made by using FIG. 3 about an antenna configuration example of the one-wavelength twisted Z-shaped three-orthogonal dipole antenna, the antenna configuration example being different from that of the antenna 11 of FIG. 1. FIG. 3 is a schematic diagram illustrating the antenna configuration example of the one-wavelength twisted Z-shaped three-orthogonal dipole antenna as one example of the antenna according to the present example embodiment, the antenna configuration example being different from that of the antenna 11 of FIG. 1.

An antenna 11A illustrated in FIG. 3 depicts an example where an arrangement position of the feeding point 4 is different from the antenna 11 of FIG. 1. That is, in a case of the antenna 11A illustrated in FIG. 3, the arrangement position of the feeding point 4 is not set to the central position of the first half-wavelength element 1 in a case of the antenna 11 of FIG. 1 but is changed to the central position of the second half-wavelength element 2. In other words, in the antenna 11A of FIG. 3, the position of the feeding point 4 is arranged not in the position in which the one end portion of the first (¼) wavelength element 1*a* is joined to the one end portion of the second (¼) wavelength element 1*b* but in the central position of the second half-wavelength element 2, and the "one-wavelength twisted Z-shaped three-orthogonal dipole antenna" is thereby formed.

Figure 4:
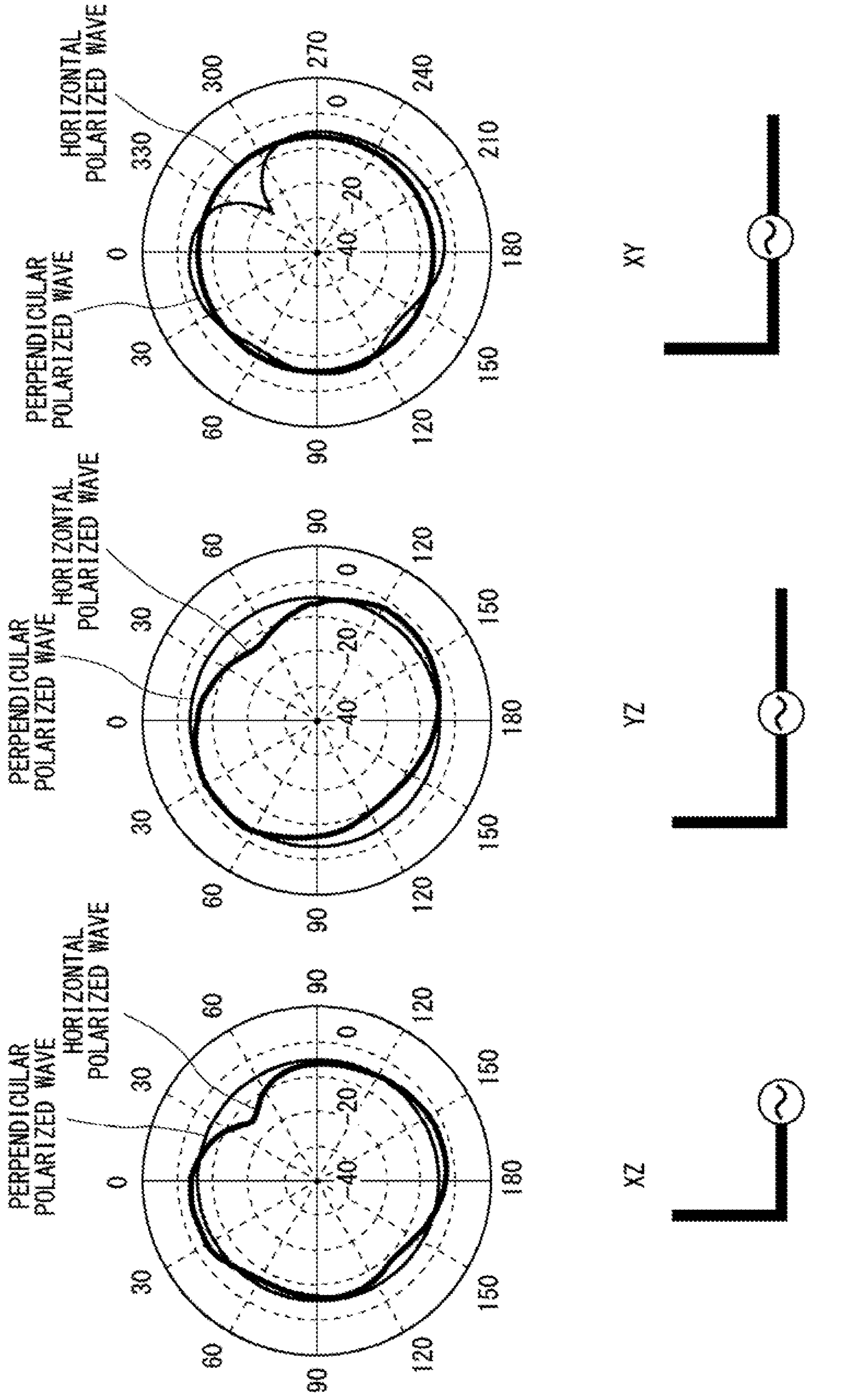
FIG. 4 is a pattern diagram illustrating the antenna radiation patterns of the antenna illustrated in FIG. 3.

As the antenna 11A illustrated in FIG. 3, even if the position of the feeding point 4 is changed, as illustrated in a pattern diagram of FIG. 4, in the antenna radiation patterns, the polarized waves of the wireless electric wave are present in each plane of the three planes of the XZ plane, YZ plane, and XY plane. Note that in FIG. 4, the characteristic curves of the horizontal polarized wave are illustrated by thick lines, and the characteristic curves of the perpendicular polarized wave are illustrated by thin lines. FIG. 4 is the pattern diagram illustrating the antenna radiation patterns of the antenna 11A illustrated in FIG. 3 (that is, the one-wavelength twisted Z-shaped three-orthogonal dipole antenna). It may be understood that the antenna 11A illustrated in FIG. 3 uniformly emits the wireless electric wave in all directions.

Figure 5:
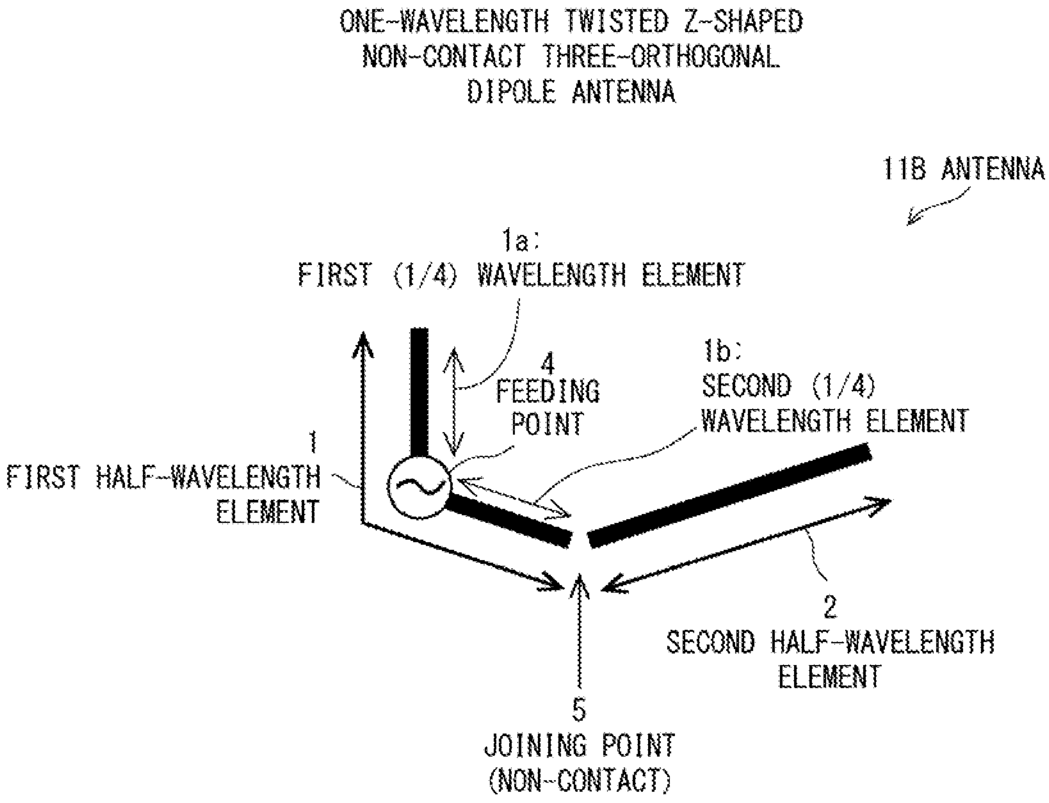
FIG. 5 is a schematic diagram illustrating an antenna configuration example of the one-wavelength twisted Z-shaped three-orthogonal dipole antenna as one example of the antenna according to the example embodiment, the antenna configuration example being different from those of the antennas of FIG. 1 and FIG. 3.

Next, a description will be made by using FIG. 5 about an antenna configuration example of the one-wavelength twisted Z-shaped three-orthogonal dipole antenna, the antenna configuration example being different from those of the antenna 11 of FIG. 1 and the antenna 11A of FIG. 3. FIG. 5 is a schematic diagram illustrating the antenna configuration example of the one-wavelength twisted Z-shaped three-orthogonal dipole antenna as one example of the antenna according to the present example embodiment, the antenna configuration example being different from those of the antenna 11 of FIG. 1 and the antenna 11A of FIG. 3.

An antenna 11B illustrated in FIG. 5 depicts an example where the point that in the joining point 5, the respective end portions of the first half-wavelength element 1 and the second half-wavelength element 2 are arranged in a mutually non-contact state in adjacent positions is different from the antenna 11 of FIG. 1. In other words, the antenna 11B of FIG. 5 depicts an example where the "one-wavelength twisted Z-shaped three-orthogonal dipole antenna" is configured as a "one-wavelength twisted Z-shaped non-contact three-orthogonal dipole antenna" in which some of the elements are in a non-contact state. That is, a case of the antenna 11B of FIG. 5 depicts a case where the other end portion of the second (¼) wavelength element 1*b* is not joined to the one end portion of the second half-wavelength element 2 but the other end portion of the second (¼) wavelength element 1*b* and the one end portion of the second half-wavelength element 2 are arranged in a non-contact state in mutually adjacent positions and the "one-wavelength twisted Z-shaped non-contact three-orthogonal dipole antenna" is thereby formed. The first half-wavelength element 1 and the second half-wavelength element 2 are arranged in a non-contact state in such a manner, and although details will be described later, an advantage of being capable of easily installing the antenna on a substrate can thereby be obtained.

Figure 6:
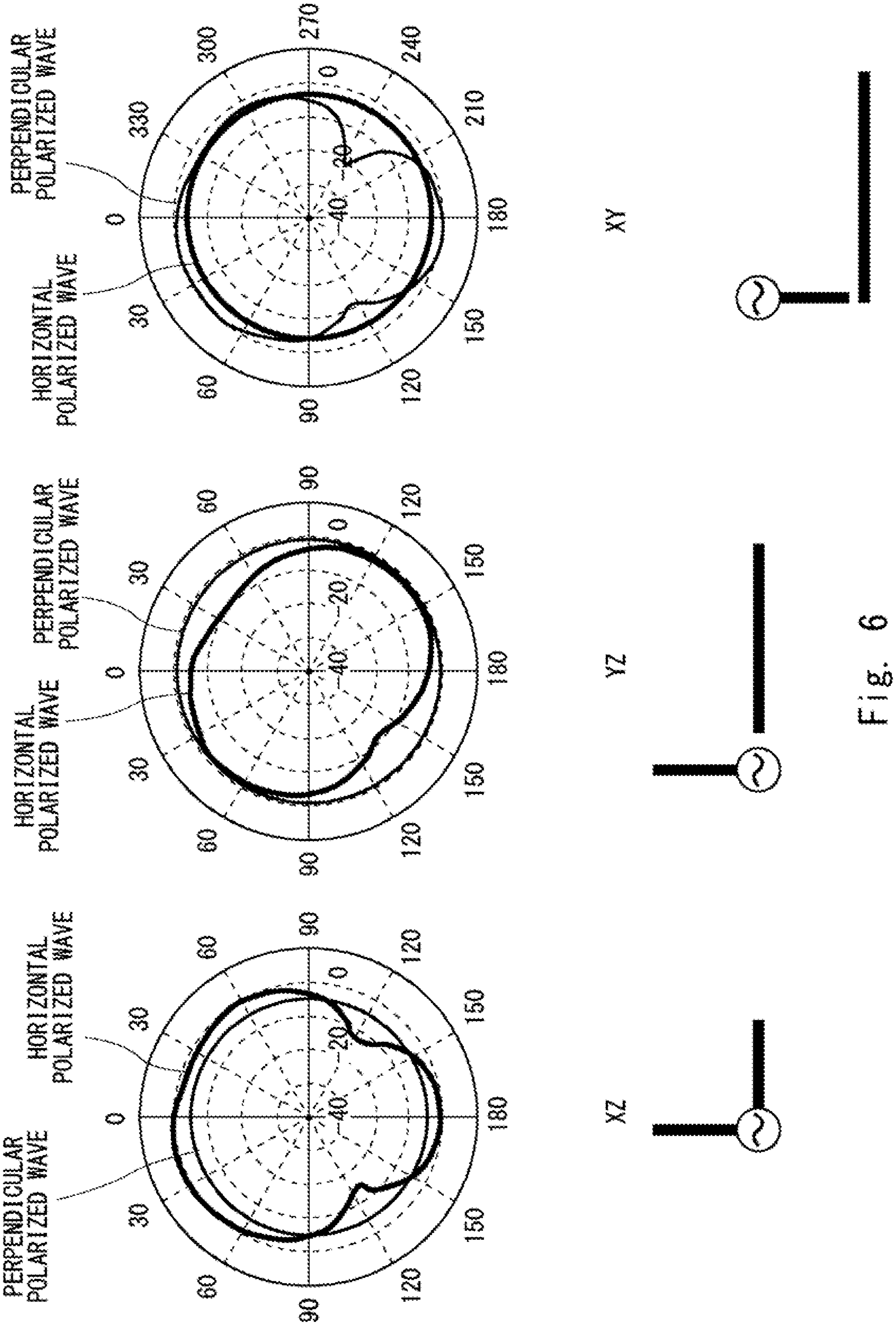
FIG. 6 is a pattern diagram illustrating the antenna radiation patterns of the antenna illustrated in FIG. 5.

As the antenna 11B illustrated in FIG. 5, even in a case where the first half-wavelength element 1 and the second half-wavelength element 2 are arranged in a non-contact state, as illustrated in a pattern diagram of FIG. 6, in the antenna radiation patterns, the polarized waves of the wireless electric wave are present in each plane of the three planes of the XZ plane, YZ plane, and XY plane. Note that in FIG. 6, the characteristic curves of the horizontal polarized wave are illustrated by thick lines, and the characteristic curves of the perpendicular polarized wave are illustrated by thin lines. FIG. 6 is the pattern diagram illustrating the antenna radiation patterns of the antenna 11B illustrated in FIG. 5 (that is, the one-wavelength twisted Z-shaped non-contact three-orthogonal dipole antenna). It may be understood that the antenna 11B illustrated in FIG. 5 uniformly emits the wireless electric wave in all directions.

Figure 31A:
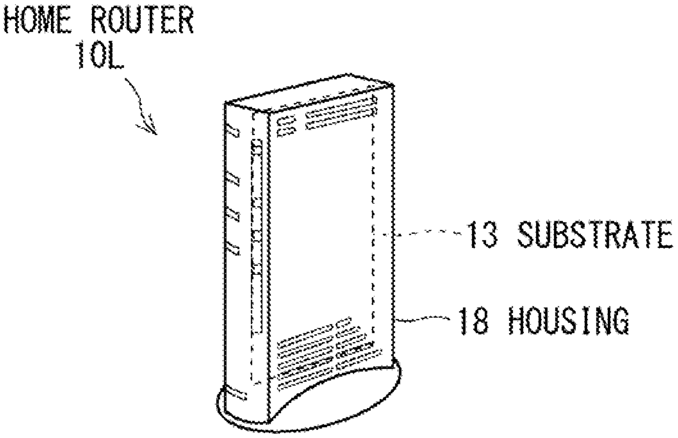
FIG. 31A is a schematic diagram illustrating an antenna configuration of a common home router using a dipole antenna in related art.
Figure 31B:
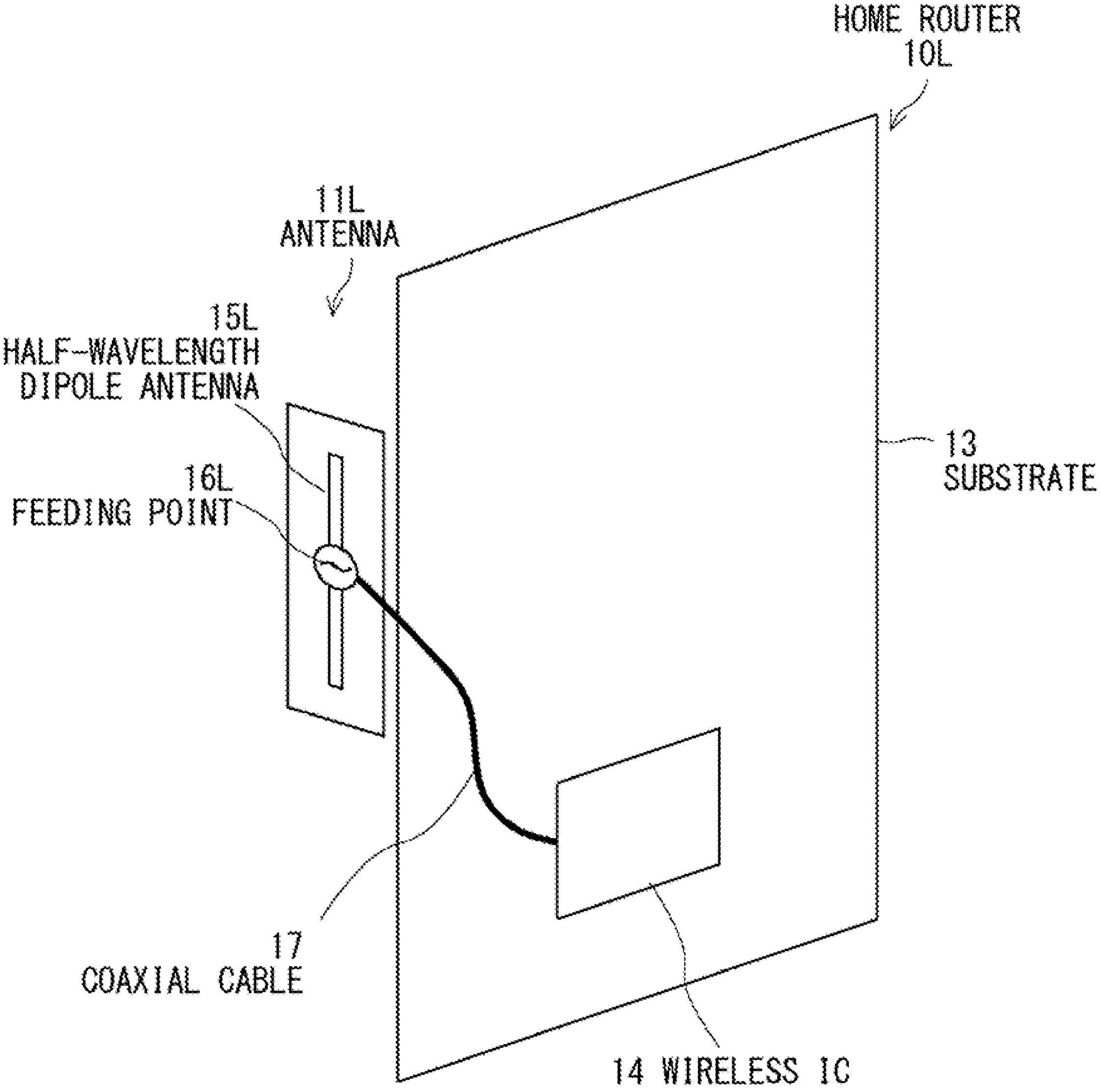
FIG. 31B is a schematic diagram illustrating an antenna configuration of the common home router using the dipole antenna in related art.

Next, a description will be made by using FIG. 7 about a configuration example of a wireless communication apparatus in which the antenna 11B illustrated in FIG. 5 is installed as one example of a wireless communication apparatus according to the present example embodiment, the wireless communication apparatus including a dipole antenna for radiating a wireless electric wave. Here, the wireless communication apparatus of FIG. 7 will be described by using, as an example, a case of a home router similar to a home router 10L illustrated in FIG. 31A and FIG. 31B as related art.

Figure 7:
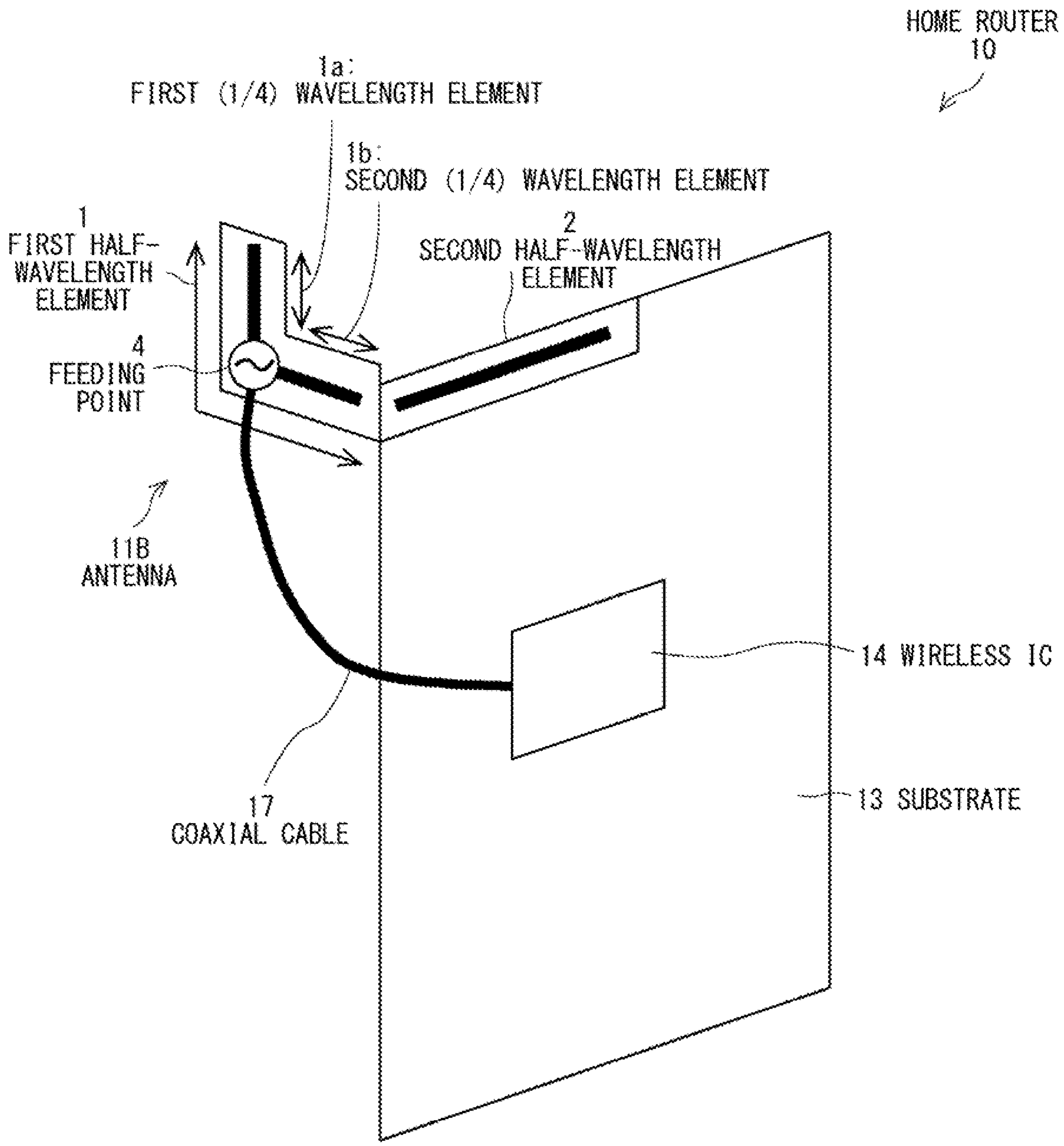
FIG. 7 is a perspective view illustrating one example of an antenna configuration of a home router using the antenna illustrated in FIG. 5 as one example of the example embodiment.

FIG. 7 is a perspective view illustrating one example of an antenna configuration of a home router using the antenna 11B illustrated in FIG. 5 as one example of the present example embodiment and illustrates one example of an antenna configuration mounted on an internal portion of the home router.

As illustrated in FIG. 7, in a home router 10 of FIG. 7, a wireless IC (integrated circuit) 14 for performing power feeding to the antenna 11B is installed on a substrate 13, and the wireless IC 14 is connected with the feeding point 4 arranged at the center of the first half-wavelength element 1 via a coaxial cable 17. By using the coaxial cable 17, power can be fed from the wireless IC 14 to the feeding point 4 of the antenna 11B while loss of signal power is reduced.

In addition, as illustrated in FIG. 7, the home router 10 of FIG. 7 is configured such that the second half-wavelength element 2 of the antenna 11B is directly installed on the substrate 13 in which the wireless IC 14 is installed. In other words, in a case where there is room in a component mounting space on the substrate 13, when the second half-wavelength element 2 of the antenna 11B is directly installed on the substrate 13, cost reduction can be intended. In this case, as described above, the antenna 11B is formed as the "one-wavelength twisted Z-shaped non-contact three-orthogonal dipole antenna" in which the second half-wavelength element 2 is in a non-contact state with the first half-wavelength element 1. Consequently, it becomes easy to perform pattern drawing of the second half-wavelength element 2 on the substrate 13, the first half-wavelength element 1 in an orthogonal state to the second half-wavelength element 2 on the substrate 13 is caused to become a non-contact state, the first (¼) wavelength element 1*a* and the second (¼) wavelength element 1*b* of the first half-wavelength element 1 can thereby easily be arranged on the outside of the substrate 13, and the three-orthogonal state of the antenna 11B can easily be formed.

Figure 8:
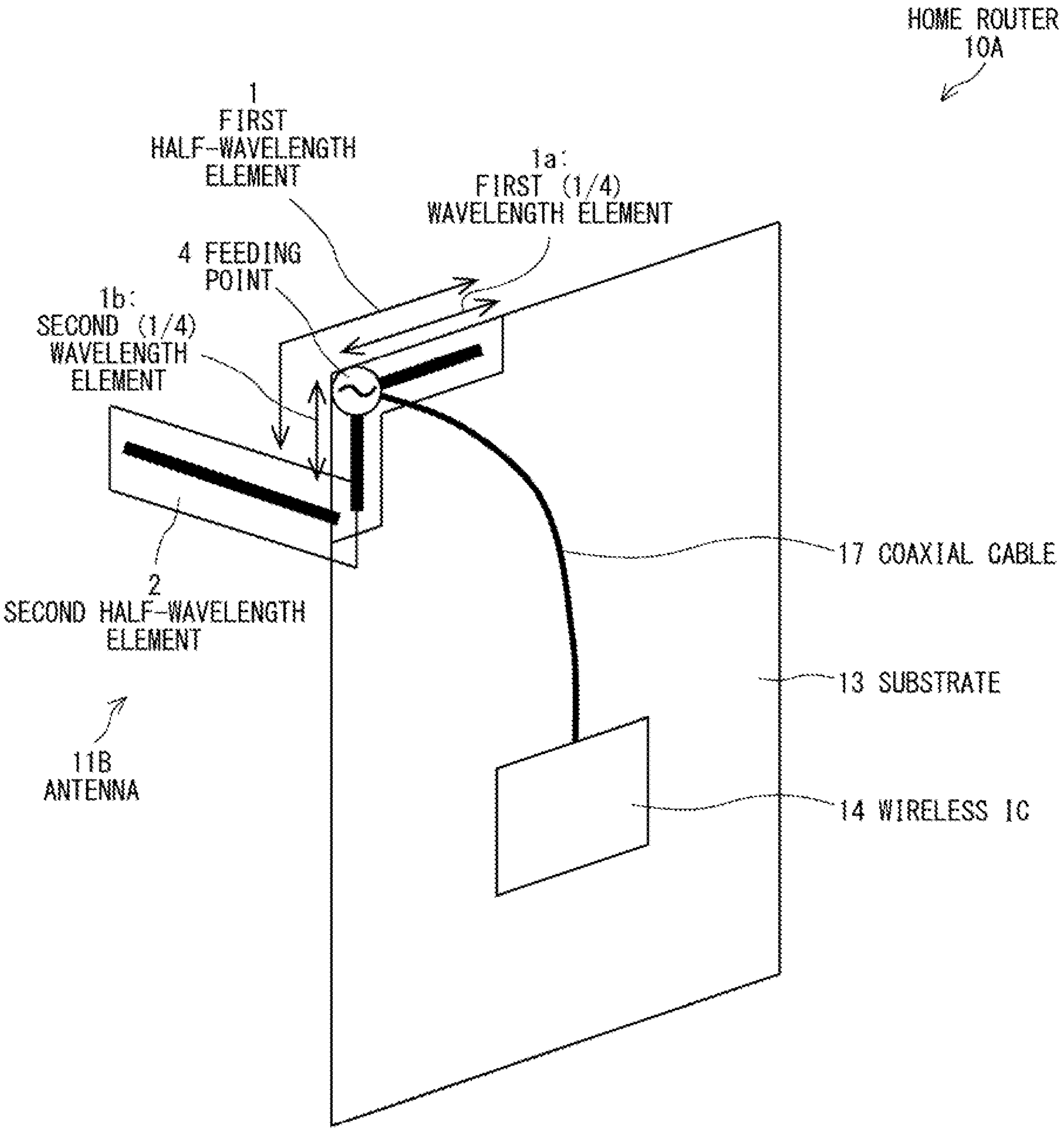
FIG. 8 is a perspective view illustrating an example of an antenna configuration of a home router using the antenna illustrated in FIG. 5 as one example of the example embodiment, the example being different from FIG. 7.

Further, FIG. 8 is a perspective view illustrating an example of an antenna configuration of a home router using the antenna 11B illustrated in FIG. 5 as one example of the present example embodiment, the example being different from FIG. 7. As illustrated in FIG. 8, a home router 10A of FIG. 8 depicts an example where the element of the antenna 11B to be directly installed on the substrate 13 in which the wireless IC 14 is installed is switched with the element in a case of the home router 10 of FIG. 7.

That is, in the home router 10A of FIG. 8, the first (¼) wavelength element 1*a* and the second (¼) wavelength element 1*b* of the first half-wavelength element 1 of the antenna 11B are directly installed on the substrate 13 in an L-shape, and the second half-wavelength element 2 orthogonal to the first half-wavelength element 1 is arranged on the outside of the substrate 13. In a case of the home router 10A of FIG. 8, similarly to FIG. 7, the second half-wavelength element 2 in an orthogonal state to the first half-wavelength element 1 installed on the substrate 13 is caused to become a non-contact state, it thereby becomes easy to perform pattern drawing of the first (¼) wavelength element 1*a* and the second (¼) wavelength element 1*b* of the first half-wavelength element 1 on the substrate 13 in an L-shape, the second half-wavelength element 2 can easily be arranged on the outside of the substrate 13, and the three-orthogonal state of the antenna 11B can easily be formed.

Figure 9:
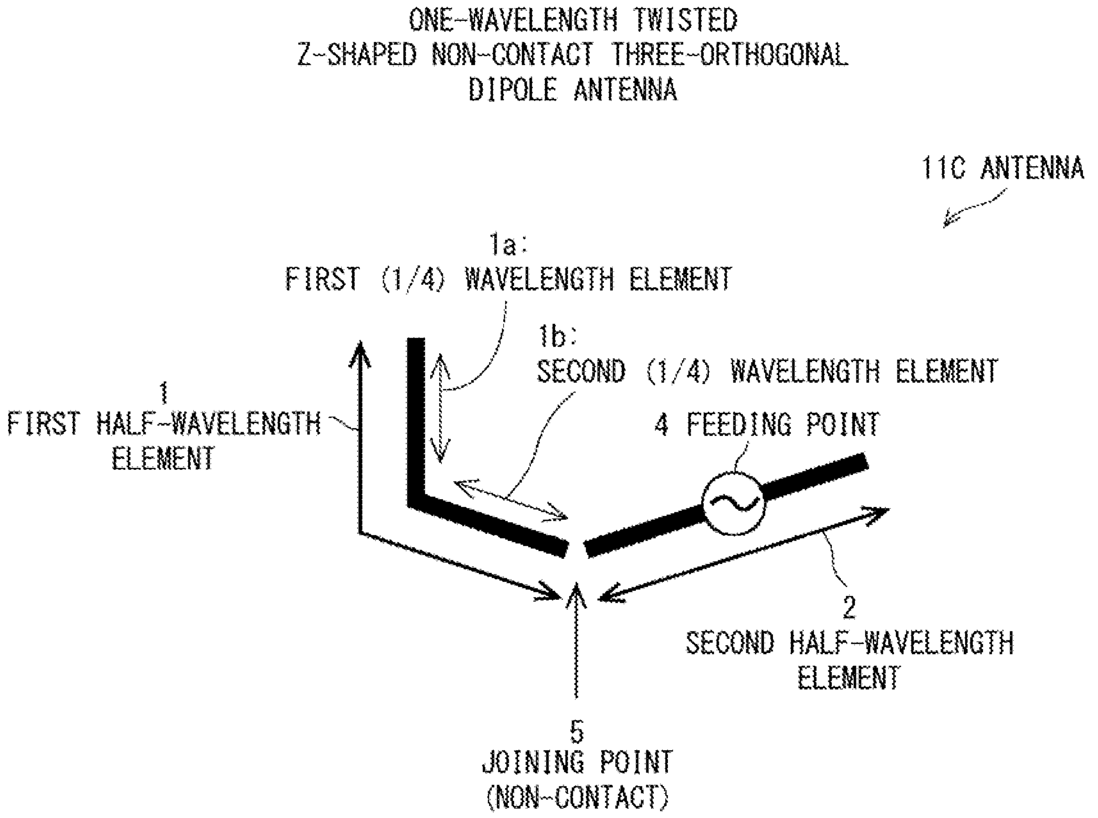
FIG. 9 is a schematic diagram illustrating an antenna configuration example of the one-wavelength twisted Z-shaped three-orthogonal dipole antenna as one example of the antenna according to the example embodiment, the antenna configuration example being different from those of the antennas of FIG. 1, FIG. 3, and FIG. 5.

Next, a description will be made by using FIG. 9 about an antenna configuration example of the one-wavelength twisted Z-shaped three-orthogonal dipole antenna, the antenna configuration example being different from those of the antenna 11 of FIG. 1, the antenna 11A of FIG. 3, and the antenna 11B of FIG. 5. FIG. 9 is a schematic diagram illustrating the antenna configuration example of the one-wavelength twisted Z-shaped three-orthogonal dipole antenna as one example of the antenna according to the present example embodiment, the antenna configuration example being different from those of the antenna 11 of FIG. 1, the antenna 11A of FIG. 3, and the antenna 11B of FIG. 5.

An antenna 11C illustrated in FIG. 9 depicts an example where the point that in the joining point 5, the respective end portions of the first half-wavelength element 1 and the second half-wavelength element 2 are arranged in a mutually non-contact state is different from the antenna 11A of FIG. 3. In other words, the antenna 11C of FIG. 9 depicts an example where similarly to the case of the antenna 11B of FIG. 5, the "one-wavelength twisted Z-shaped three-orthogonal dipole antenna" is configured as a "one-wavelength twisted Z-shaped non-contact three-orthogonal dipole antenna" in which some of the elements are in a non-contact state. As described above in the home router 10 of FIG. 7, also in the antenna 11C of FIG. 9, the first half-wavelength element 1 and the second half-wavelength element 2 are arranged in a non-contact state, and the antenna can thereby easily be installed on the substrate.

Figure 10:
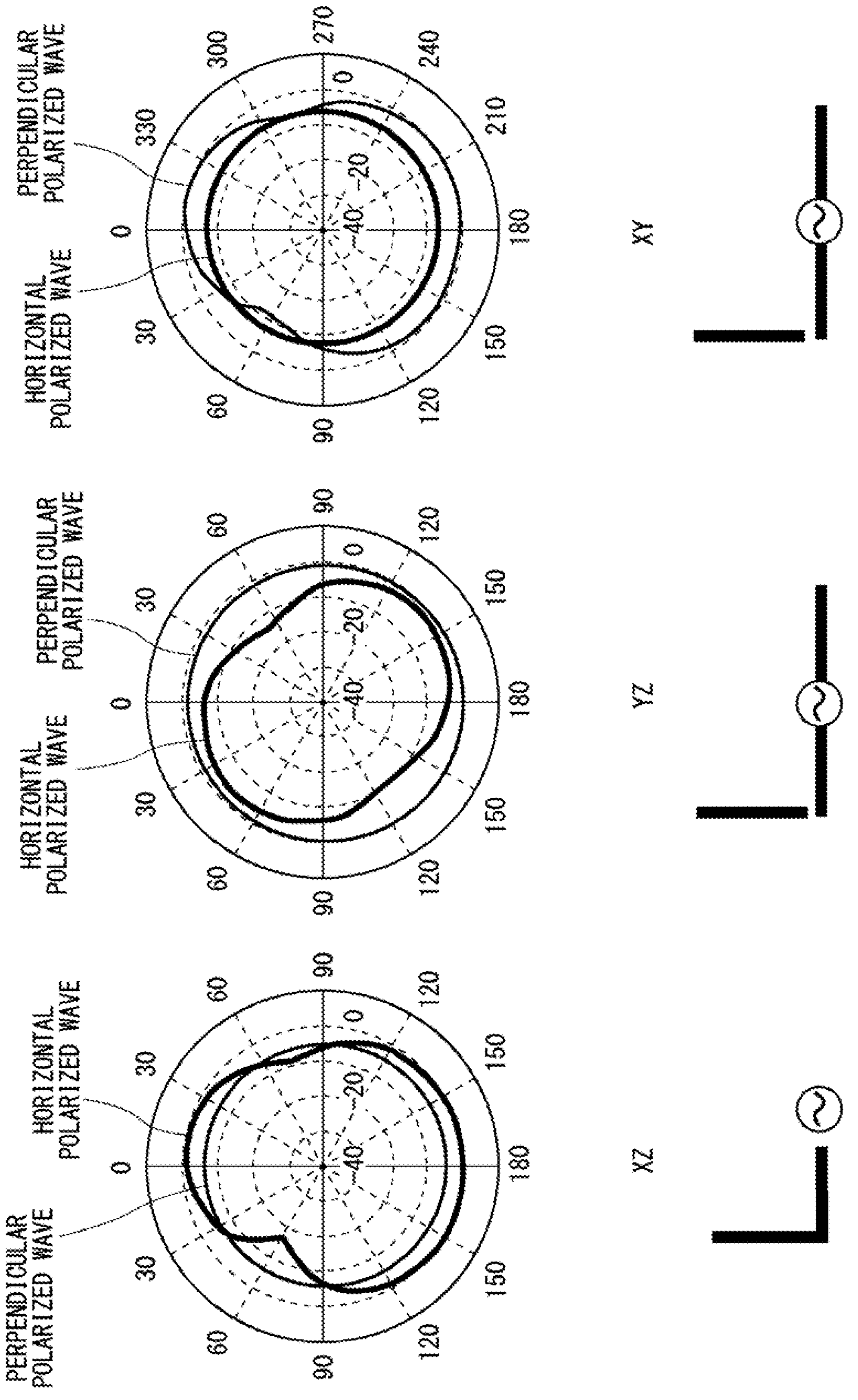
FIG. 10 is a pattern diagram illustrating the antenna radiation patterns of the antenna illustrated in FIG. 9.

As the antenna 11C illustrated in FIG. 9, even in a case where the feeding point 4 is arranged at the center of the second half-wavelength element 2 and the first half-wavelength element 1 and the second half-wavelength element 2 are arranged in a non-contact state, similarly to the case of the antenna 11B of FIG. 5, as illustrated in a pattern diagram of FIG. 10, in the antenna radiation patterns, the polarized waves of the wireless electric wave are present in each plane of the three planes of the XZ plane, YZ plane, and XY plane. Note that in FIG. 10, the characteristic curves of the horizontal polarized wave are illustrated by thick lines, and the characteristic curves of the perpendicular polarized wave are illustrated by thin lines. FIG. 10 is the pattern diagram illustrating the antenna radiation patterns of the antenna 11C illustrated in FIG. 9 (that is, the one-wavelength twisted Z-shaped non-contact three-orthogonal dipole antenna). It may be understood that the antenna 11C illustrated in FIG. 9 uniformly emits the wireless electric wave in all directions.

Next, a description will be made by using FIG. 11 about a configuration example of a wireless communication apparatus in which the antenna 11C illustrated in FIG. 9 as one example of the present example embodiment is installed as one example of the wireless communication apparatus according to the present example embodiment. Here, similarly to the cases of FIG. 7 and FIG. 8, the wireless communication apparatus of FIG. 11 will also be described by using, as an example, a case of a home router similar to the home router 10L illustrated in FIG. 31A and FIG. 31B as related art.

Figure 11:
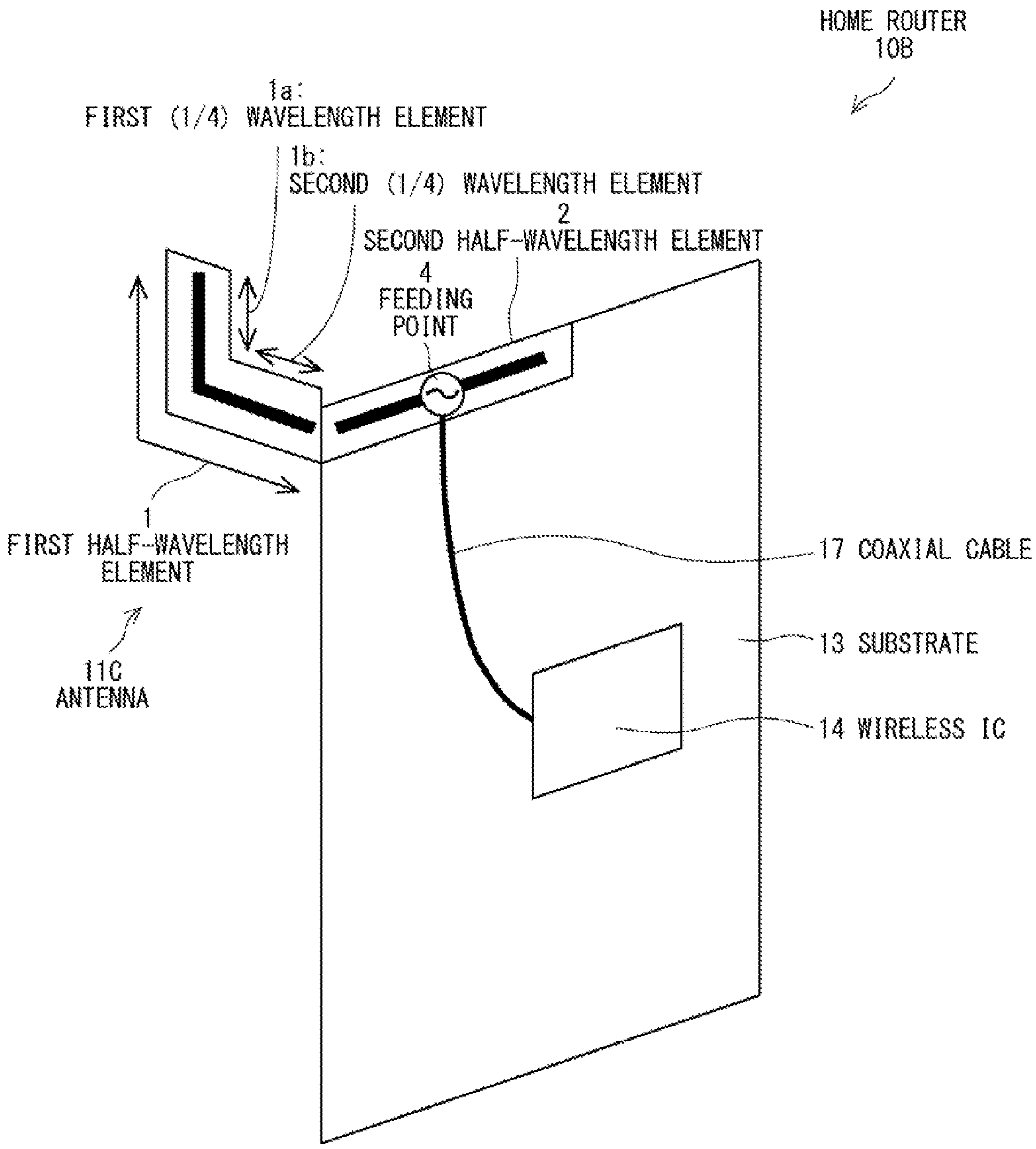
FIG. 11 is a perspective view illustrating one example of an antenna configuration of a home router using the antenna illustrated in FIG. 9 as one example of the example embodiment.

FIG. 11 is a perspective view illustrating one example of an antenna configuration of a home router using the antenna 11C illustrated in FIG. 9 as one example of the present example embodiment and illustrates one example of an antenna configuration mounted on an internal portion of the home router.

As illustrated in FIG. 11, in a home router 10B of FIG. 11, the wireless IC (integrated circuit) 14 for performing power feeding to the antenna 11C is installed on the substrate 13, and the wireless IC 14 is connected with the feeding point 4 arranged at the center of the second half-wavelength element 2 via the coaxial cable 17. By using the coaxial cable 17, power can be fed from the wireless IC 14 to the feeding point 4 of the antenna 11C while loss of signal power is reduced. Note that the wireless IC 14 and the feeding point 4 may be connected together by using a stripline instead of the coaxial cable 17.

Here, as illustrated in FIG. 11, similarly to the case of FIG. 7, the home router 10B of FIG. 11 is configured such that the second half-wavelength element 2 of the antenna 11C is directly installed on the substrate 13 in which the wireless IC 14 is installed. In other words, in a case where there is room in the component mounting space on the substrate 13, when the second half-wavelength element 2 of the antenna 11C is directly installed on the substrate 13, cost reduction can be intended. In this case, as described above, the antenna 11C is formed as the "one-wavelength twisted Z-shaped non-contact three-orthogonal dipole antenna" in which the second half-wavelength element 2 is in a non-contact state with the first half-wavelength element 1. Consequently, it becomes easy to perform pattern drawing of the second half-wavelength element 2 on the substrate 13, the first half-wavelength element 1 in an orthogonal state to the second half-wavelength element 2 on the substrate 13 is caused to become a non-contact state, the first (¼) wavelength element 1*a* and the second (¼) wavelength element 1*b* of the first half-wavelength element 1 can thereby easily be arranged on the outside of the substrate 13, and the three-orthogonal state of the antenna 11C can easily be formed.

Figure 12:
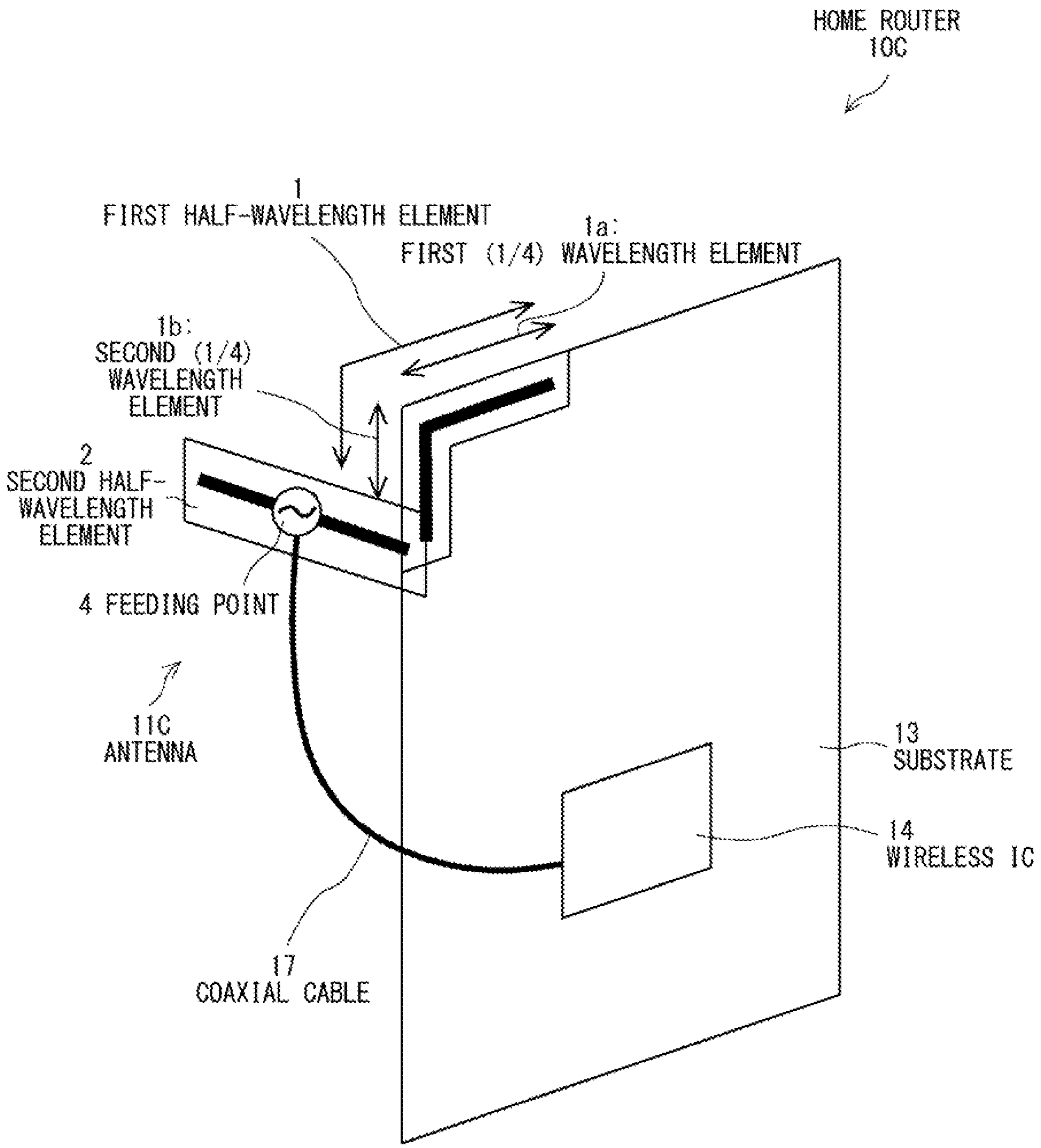
FIG. 12 is a perspective view illustrating an example of an antenna configuration of a home router using the antenna illustrated in FIG. 9 as one example of the example embodiment, the example being different from FIG. 11.

Further, FIG. 12 is a perspective view illustrating an example of an antenna configuration of a home router using the antenna 11C illustrated in FIG. 9 as one example of the present example embodiment, the example being different from FIG. 11. As illustrated in FIG. 12, a home router 10C of FIG. 12 depicts an example where the element of the antenna 11C to be directly installed on the substrate 13 in which the wireless IC 14 is installed is switched with the element in a case of the home router 10B of FIG. 11.

That is, in the home router 10C of FIG. 12, similarly to the case of the home router 10A of FIG. 8, the first (¼) wavelength element 1*a* and the second (¼) wavelength element 1*b* of the first half-wavelength element 1 of the antenna 11C are directly installed on the substrate 13 in an L-shape, and the second half-wavelength element 2 orthogonal to the first half-wavelength element 1 is arranged on the outside of the substrate 13. In a case of the home router 10C of FIG. 12, similarly to FIG. 11, the second half-wavelength element 2 in an orthogonal state to the first half-wavelength element 1 installed on the substrate 13 is caused to become a non-contact state, it thereby becomes easy to perform pattern drawing of the first (¼) wavelength element 1*a* and the second (¼) wavelength element 1*b* of the first half-wavelength element 1 on the substrate 13 in an L-shape, the second half-wavelength element 2 can easily be arranged on the outside of the substrate 13, and the three-orthogonal state of the antenna 11C can easily be formed.

(Antenna Configuration Examples of 1.5-Wavelength (Three-Half-Wavelength) Twisted Z-Shaped Three-Orthogonal Dipole Antenna)

Next, a description will be made about antenna configuration examples of "1.5-wavelength twisted Z-shaped three-orthogonal dipole antenna" whose whole length is 1.5 wavelengths (that is, three half-wavelengths) at a frequency defined arbitrarily and in advance. Note that in the following descriptions, a description will be made about a case where the antenna is placed in a perpendicular direction to the ground (XY plane). Further, all antenna configurations described as the present example embodiment in the following represent examples which enable planes having no polarized wave of a wireless electric wave to be removed.

Figure 13:
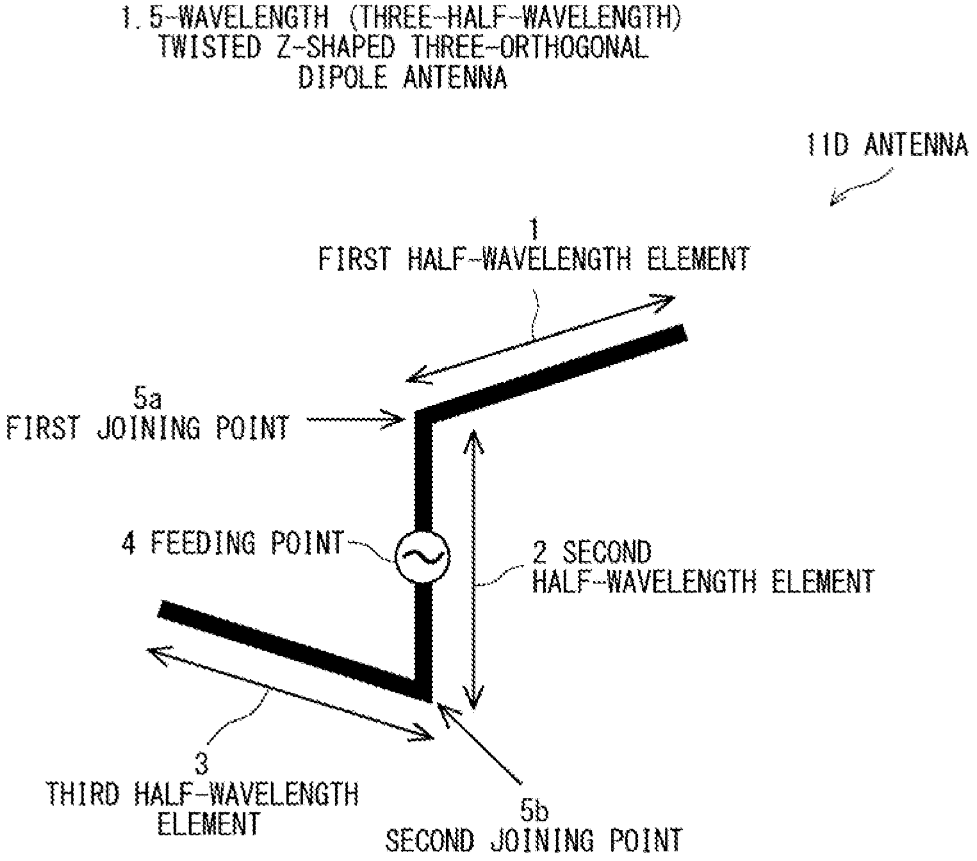
FIG. 13 is a schematic diagram illustrating one example of an antenna configuration of a 1.5-wavelength twisted Z-shaped three-orthogonal dipole antenna as one example of an antenna according to the example embodiment.

FIG. 13 is a schematic diagram illustrating one example of an antenna configuration of the 1.5-wavelength twisted Z-shaped three-orthogonal dipole antenna as one example of the antenna according to the present example embodiment. As illustrated in FIG. 13, an antenna 11D is in a state where respective end portions of the first half-wavelength element 1 and the second half-wavelength element 2 which result from bending at a right angle are joined to and contact with each other in a first joining point 5*a* and where respective end portions of a third half-wavelength element 3, which is formed by bending the second half-wavelength element 2 at a right angle in a twisted direction (that is, further bending the second half-wavelength element 2 in an orthogonal direction to the first half-wavelength element 1), and the second half-wavelength element 2 are joined to and contact with each other in a second joining point 5*b*.

As a result, the antenna 11D is in a state where three half-wavelength elements of the first half-wavelength element 1, the second half-wavelength element 2, and the third half-wavelength element 3 are orthogonal to each other (that is, the three-orthogonal state) and is thereby formed as a "1.5-wavelength twisted Z-shaped three-orthogonal dipole antenna". Forming the state where the three elements are orthogonal to each other (that is, the three-orthogonal state) in such a manner is very important for removing planes having no polarized wave of a wireless electric wave.

Furthermore, in the central position of the antenna 11D, that is, the central position of the second half-wavelength element 2, the feeding point 4 for antenna power feeding is arranged where the antenna 11D starts, and power feeding is performed via a coaxial cable or a stripline. Note that the whole length of the antenna 11D is 1.5 wavelengths, that is, three half-wavelengths.

In other words, in the antenna 11D illustrated in FIG. 13, the three elements of the first half-wavelength element 1, the second half-wavelength element 2, and the third half-wavelength element 3 which have a length of a half-wavelength at an arbitrary frequency designated in advance are arranged in the three-orthogonal state where those are orthogonal to each other. Furthermore, the one end portion of the first half-wavelength element 1 is joined to the one end portion of the second half-wavelength element 2, and the other end portion of the second half-wavelength element 2 is joined to the one end portion of the third half-wavelength element 3. In addition, the feeding point for antenna power feeding is arranged in the central position of the second half-wavelength element 2, and the "1.5-wavelength twisted Z-shaped three-orthogonal dipole antenna" is thereby formed.

Figure 14:
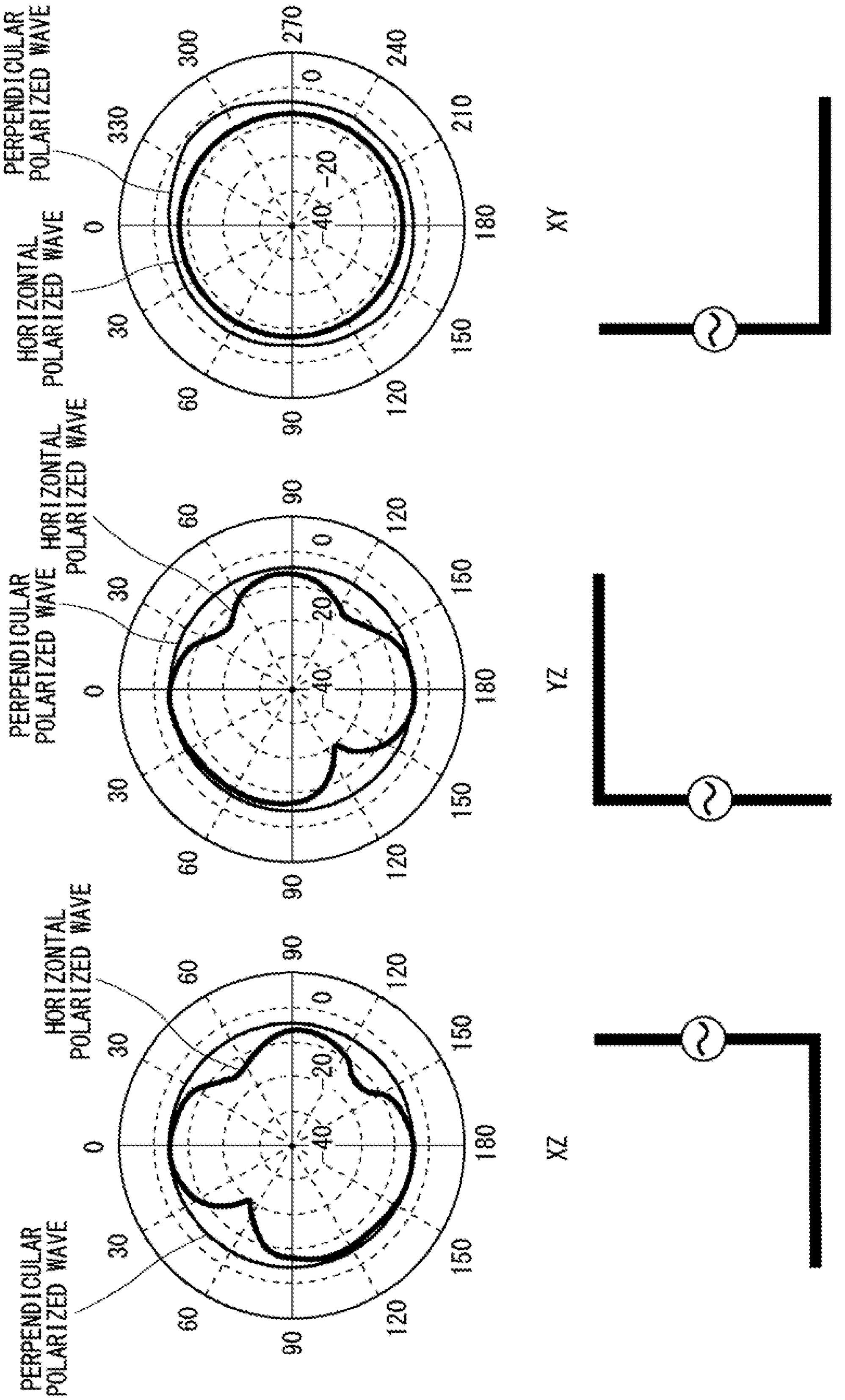
FIG. 14 is a pattern diagram illustrating the antenna radiation patterns of the antenna illustrated in FIG. 13.

FIG. 14 is a pattern diagram illustrating the antenna radiation patterns of the antenna 11D illustrated in FIG. 13 (that is, the 1.5-wavelength twisted Z-shaped three-orthogonal dipole antenna) and illustrates the respective antenna radiation patterns of the antenna 11D in the XZ plane, YZ plane, and XY plane. Note that the characteristic curves of the horizontal polarized wave are illustrated by thick lines, and the characteristic curves of the perpendicular polarized wave are illustrated by thin lines. As illustrated in the pattern diagram of FIG. 14, the polarized waves of the wireless electric wave are present in each plane of the three planes of the XZ plane, YZ plane, and XY plane. It may be understood that differently from the antenna radiation patterns of the half-wavelength dipole antenna 15L illustrated in FIG. 33 as related art, the antenna 11D illustrated in FIG. 14 uniformly emits the wireless electric wave in all directions.

Figure 15:
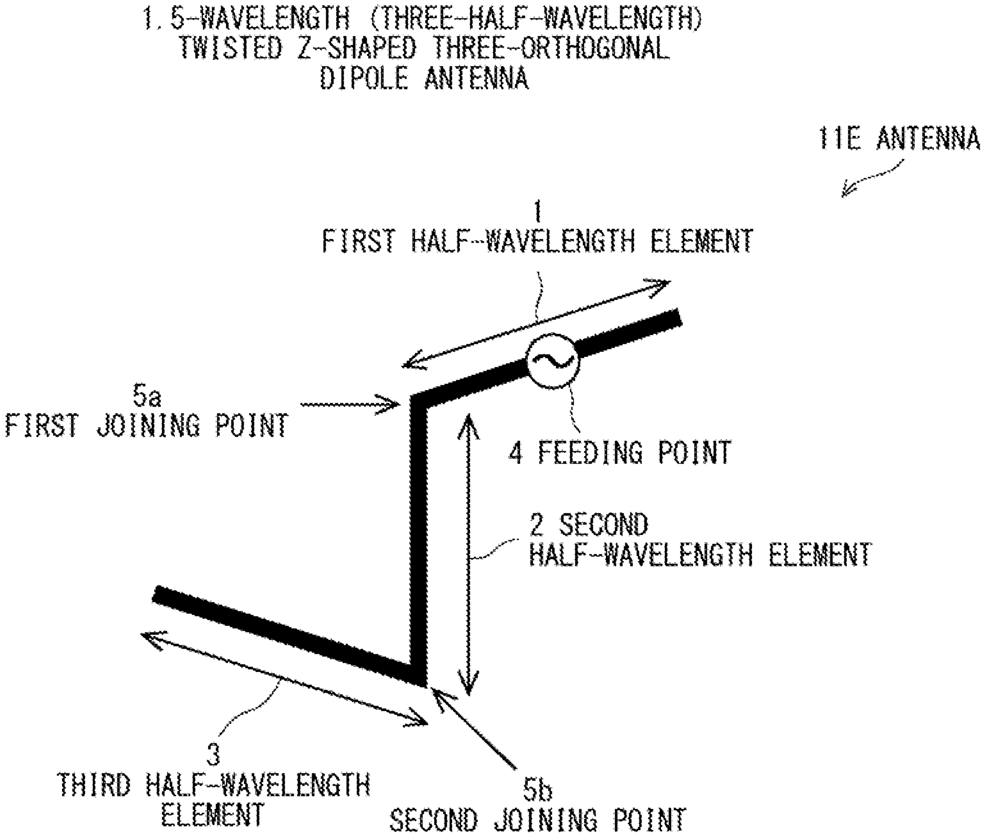
FIG. 15 is a schematic diagram illustrating an antenna configuration example of the 1.5-wavelength twisted Z-shaped three-orthogonal dipole antenna as one example of the antenna according to the example embodiment, the antenna configuration example being different from that of the antenna of FIG. 13.

Next, a description will be made by using FIG. 15 about an antenna configuration example of the 1.5-wavelength twisted Z-shaped three-orthogonal dipole antenna, the antenna configuration example being different from that of the antenna 11D of FIG. 13. FIG. 15 is a schematic diagram illustrating the antenna configuration example of the 1.5-wavelength twisted Z-shaped three-orthogonal dipole antenna as one example of the antenna according to the present example embodiment, the antenna configuration example being different from that of the antenna 11D of FIG. 13.

An antenna 11E illustrated in FIG. 15 depicts an example where the arrangement position of the feeding point 4 is different from that in the antenna 11D of FIG. 13. That is, in a case of the antenna 11E illustrated in FIG. 15, the arrangement position of the feeding point 4 is not set to the central position of the second half-wavelength element 2 in a case of the antenna 11D of FIG. 13 but is changed to the central position of the first half-wavelength element 1.

Figure 16:
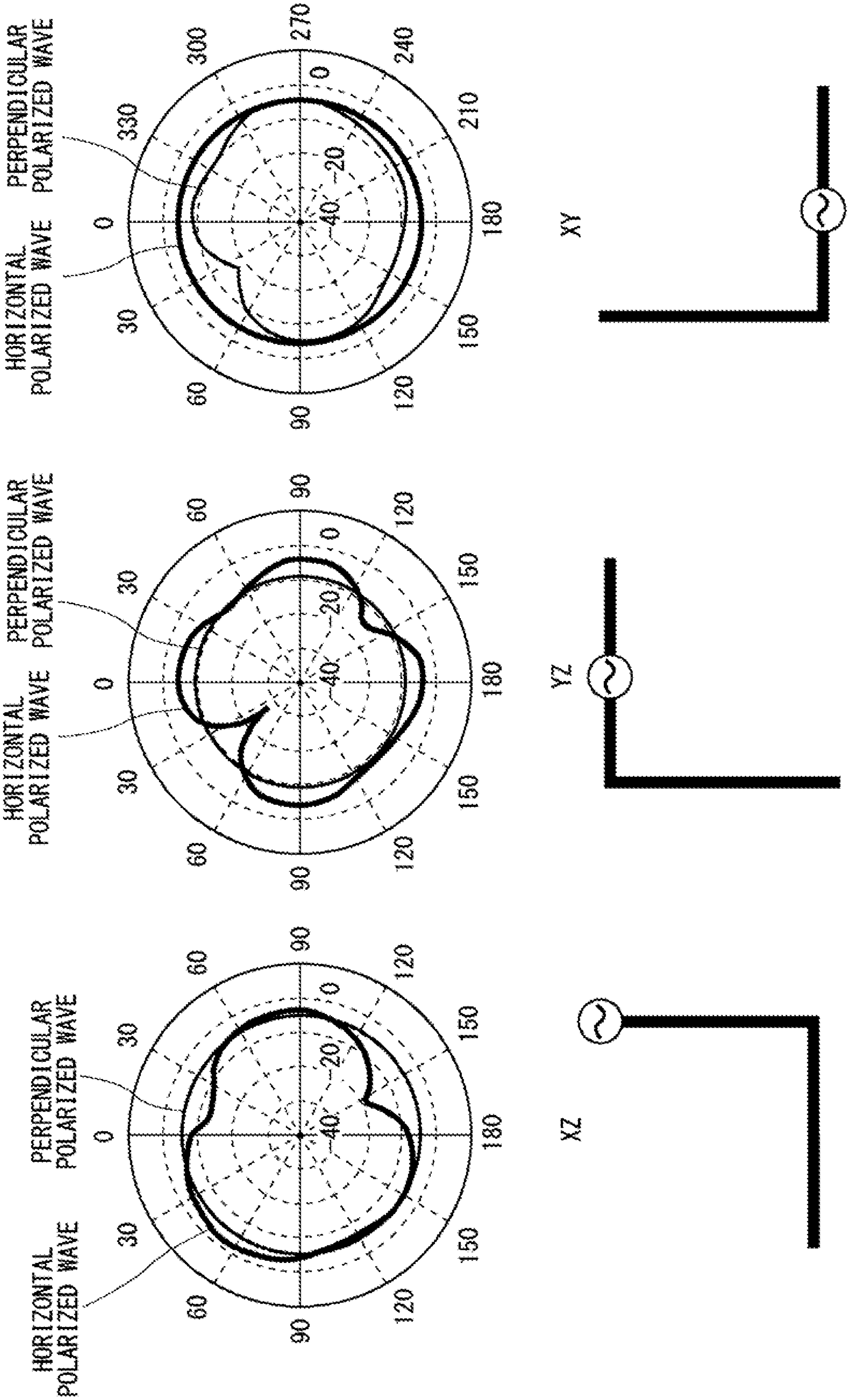
FIG. 16 is a pattern diagram illustrating the antenna radiation patterns of the antenna illustrated in FIG. 15.

As the antenna 11E illustrated in FIG. 15, even if the position of the feeding point 4 is changed, as illustrated in a pattern diagram of FIG. 16, in the antenna radiation patterns, the polarized waves of the wireless electric wave are present in each plane of the three planes of the XZ plane, YZ plane, and XY plane. Note that in FIG. 16, the characteristic curves of the horizontal polarized wave are illustrated by thick lines, and the characteristic curves of the perpendicular polarized wave are illustrated by thin lines. FIG. 16 is the pattern diagram illustrating the antenna radiation patterns of the antenna 11E illustrated in FIG. 15 (that is, the 1.5-wavelength twisted Z-shaped three-orthogonal dipole antenna). It may be understood that the antenna 11E illustrated in FIG. 15 uniformly emits the wireless electric wave in all directions. Note that even in a case where the arrangement position of the feeding point 4 is not set to the central position of the first half-wavelength element 1 but is changed to the central position of the third half-wavelength element 3, although the antenna radiation patterns are changed in shapes of radiation patterns in the three planes of the XZ plane, YZ plane, and XY plane in FIG. 16, almost the same as the case of FIG. 16, the polarized waves of the wireless electric wave are present in each of the three planes, and the wireless electric wave is uniformly emitted in all directions as well.

Figure 17:
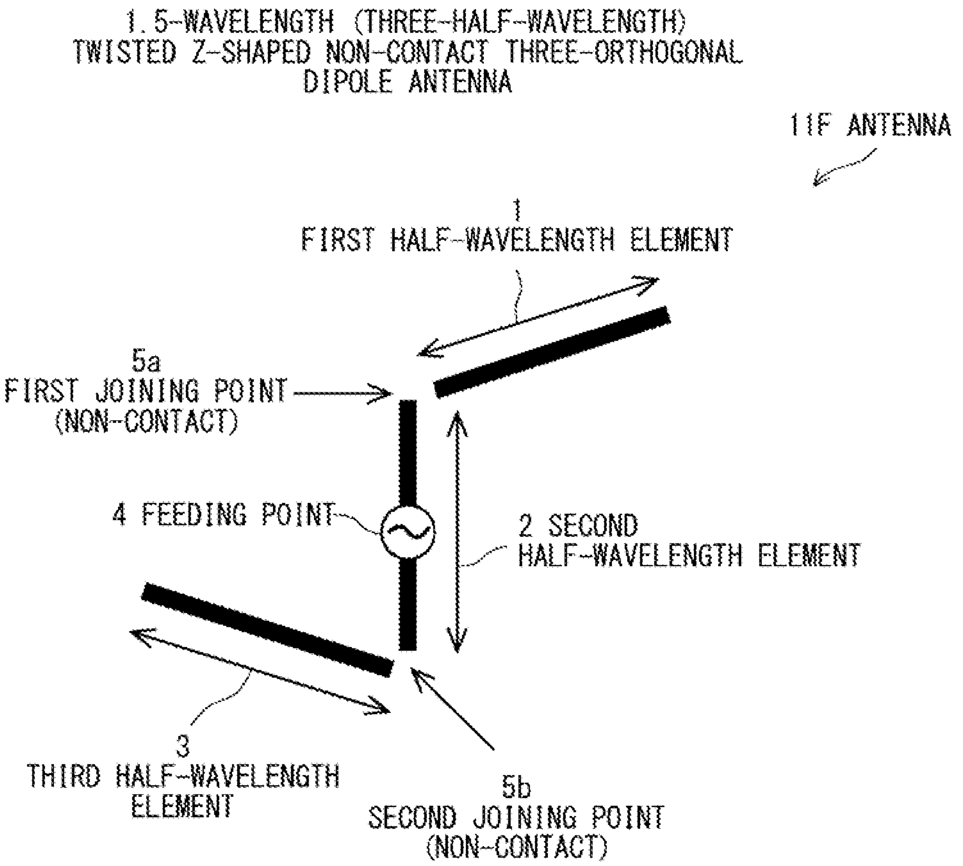
FIG. 17 is a schematic diagram illustrating an antenna configuration example of the 1.5-wavelength twisted Z-shaped three-orthogonal dipole antenna as one example of the antenna according to the example embodiment, the antenna configuration example being different from those of the antennas of FIG. 13 and FIG. 15.

Next, a description will be made by using FIG. 17 about an antenna configuration example of the 1.5-wavelength twisted Z-shaped three-orthogonal dipole antenna, the antenna configuration example being different from those of the antenna 11D of FIG. 13 and the antenna 11E of FIG. 15. FIG. 17 is a schematic diagram illustrating the antenna configuration example of the 1.5-wavelength twisted Z-shaped three-orthogonal dipole antenna as one example of the antenna according to the present example embodiment, the antenna configuration example being different from those of the antenna 11D of FIG. 13 and the antenna 11E of FIG. 15.

An antenna 11F illustrated in FIG. 17 depicts an example where the point that in the first joining point 5*a* and the second joining point 5*b*, end portions of the first half-wavelength element 1, the second half-wavelength element 2, and the third half-wavelength element 3 are respectively arranged in a mutually adjacent positional relationship and in a non-contact state is different from the antenna 11D of FIG. 13. In other words, the antenna 11F of FIG. 17 depicts an example where the "1.5-wavelength twisted Z-shaped three-orthogonal dipole antenna" is configured as a "1.5-wavelength twisted Z-shaped non-contact three-orthogonal dipole antenna" in which the half-wavelength elements are in a non-contact state with each other.

That is, a case of the antenna 11F of FIG. 17 depicts a case where one end portion of the first half-wavelength element 1 is not joined to one end portion of the second half-wavelength element 2 but the one end portion of the first half-wavelength element 1 and the one end portion of the second half-wavelength element 2 are arranged in a non-contact state in mutually adjacent positions; further, the other end portion of the second half-wavelength element 2 is not joined to one end portion of the third half-wavelength element 3 but the other end portion of the second half-wavelength element 2 and the one end portion of the third half-wavelength element 3 are also arranged in a non-contact state in mutually adjacent positions; and the "1.5-wavelength twisted Z-shaped non-contact three-orthogonal dipole antenna" is thereby formed. The first half-wavelength element 1, the second half-wavelength element 2, and the third half-wavelength element 3 are arranged in a non-contact state with each other in such a manner, and similarly to "one-wavelength twisted Z-shaped non-contact three-orthogonal dipole antenna", an advantage of being capable of easily installing the antenna on the substrate can thereby be obtained.

Figure 18:
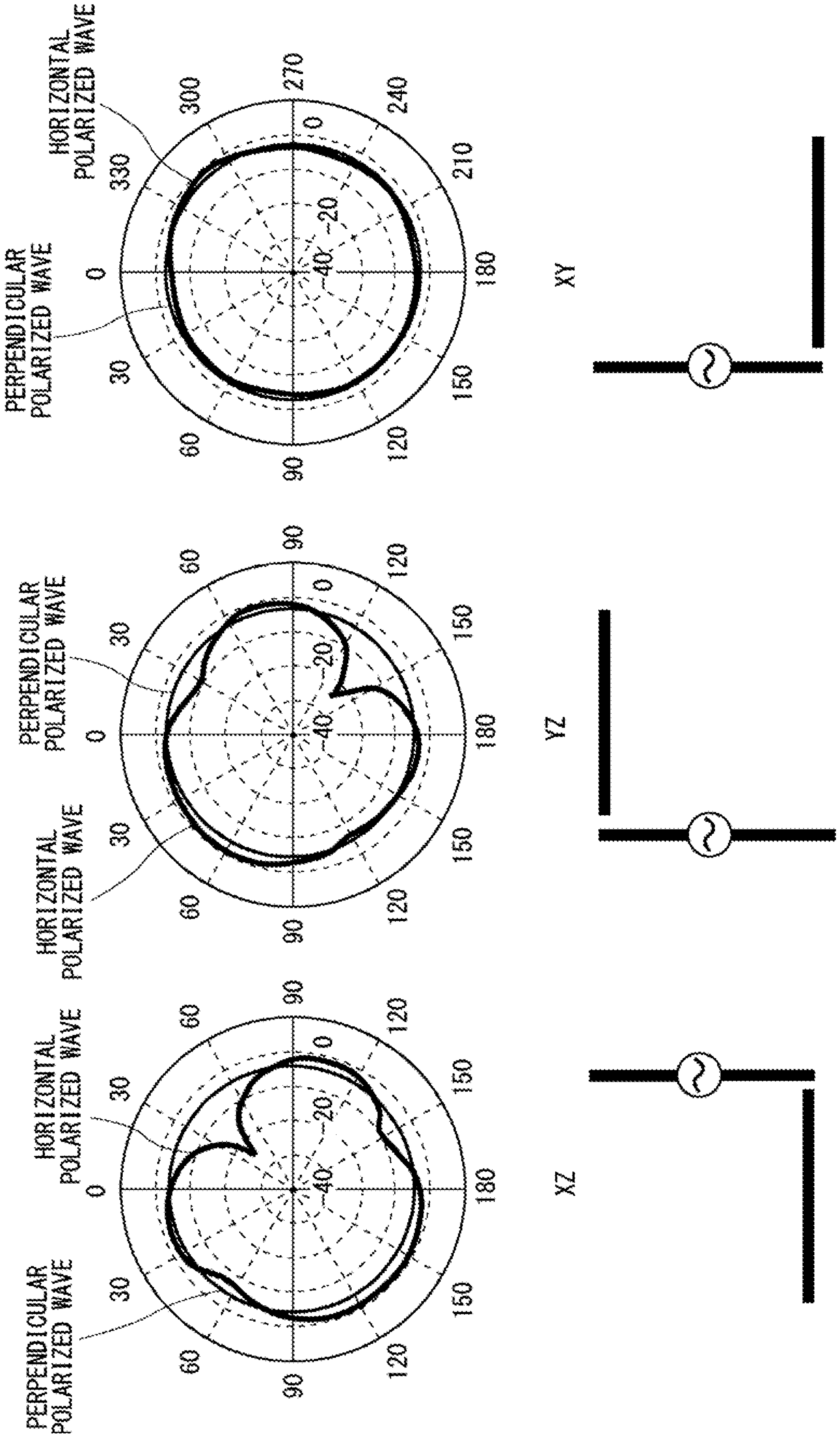
FIG. 18 is a pattern diagram illustrating the antenna radiation patterns of the antenna illustrated in FIG. 17.

Further, as the antenna 11F illustrated in FIG. 17, even in a case where the first half-wavelength element 1, the second half-wavelength element 2, and the third half-wavelength element 3 are arranged in a non-contact state with each other, as illustrated in a pattern diagram of FIG. 18, in the antenna radiation patterns, the polarized waves of the wireless electric wave are present in each plane of the three planes of the XZ plane, YZ plane, and XY plane. Note that in FIG. 18, the characteristic curves of the horizontal polarized wave are illustrated by thick lines, and the characteristic curves of the perpendicular polarized wave are illustrated by thin lines. FIG. 18 is the pattern diagram illustrating the antenna radiation patterns of the antenna 11F illustrated in FIG. 17 (that is, the 1.5-wavelength twisted Z-shaped non-contact three-orthogonal dipole antenna). It may be understood that the antenna 11F illustrated in FIG. 17 uniformly emits the wireless electric wave in all directions.

Figure 19:
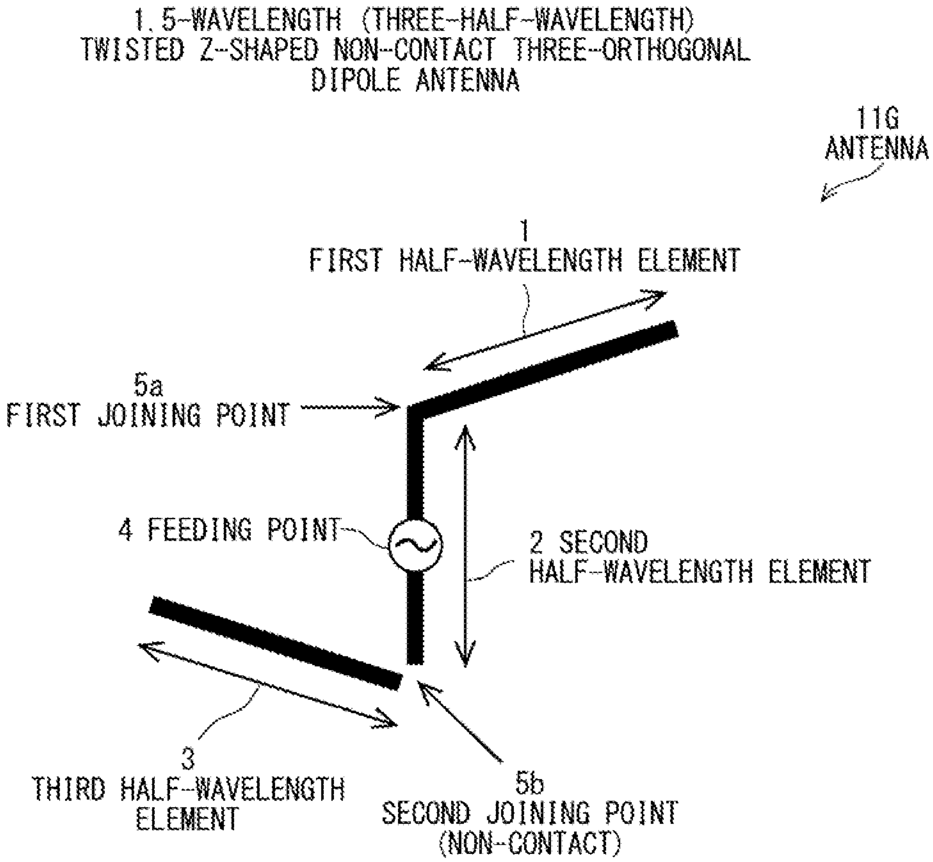
FIG. 19 is a schematic diagram illustrating an antenna configuration example of the 1.5-wavelength twisted Z-shaped three-orthogonal dipole antenna as one example of the antenna according to the example embodiment, the antenna configuration example being different from those of the antennas of FIG. 13, FIG. 15, and FIG. 17.

Next, a description will be made by using FIG. 19 about an antenna configuration example of the 1.5-wavelength twisted Z-shaped three-orthogonal dipole antenna, the antenna configuration example being different from those of the antenna 11D of FIG. 13, the antenna 11E of FIG. 15, and the antenna 11F of FIG. 17. FIG. 19 is a schematic diagram illustrating the antenna configuration example of the 1.5-wavelength twisted Z-shaped three-orthogonal dipole antenna as one example of the antenna according to the present example embodiment, the antenna configuration example being different from those of the antenna 11D of FIG. 13, the antenna 11E of FIG. 15, and the antenna 11F of FIG. 17.

An antenna 11G illustrated in FIG. 19 depicts an example where the point that in the second joining point 5*b*, the respective end portions of the second half-wavelength element 2 and the third half-wavelength element 3 are arranged in a mutually adjacent positional relationship and in a non-contact state is different from the antenna 11D of FIG. 13. In other words, the antenna 11G of FIG. 19 depicts an example where differently from the case of the antenna 11D of FIG. 13, the "1.5-wavelength twisted Z-shaped three-orthogonal dipole antenna" is configured as a "1.5-wavelength twisted Z-shaped non-contact three-orthogonal dipole antenna" in which some of the half-wavelength elements are in a non-contact state. That is, a case of the antenna 11G of FIG. 19 depicts a case where the other end portion of the second half-wavelength element 2 is not joined to the one end portion of the third half-wavelength element 3 but the other end portion of the second half-wavelength element 2 and the one end portion of the third half-wavelength element 3 are arranged in a non-contact state in mutually adjacent positions and the "1.5-wavelength twisted Z-shaped non-contact three-orthogonal dipole antenna" is thereby formed. Even in a case where some of the half-wavelength elements are arranged in a non-contact state such as a case where the third half-wavelength element 3 is caused to become a non-contact state with the other half-wavelength element in such a manner, similarly to the case of the antenna 11F of FIG. 17, an advantage of being capable of easily installing the antenna on the substrate can be obtained.

Figure 20:
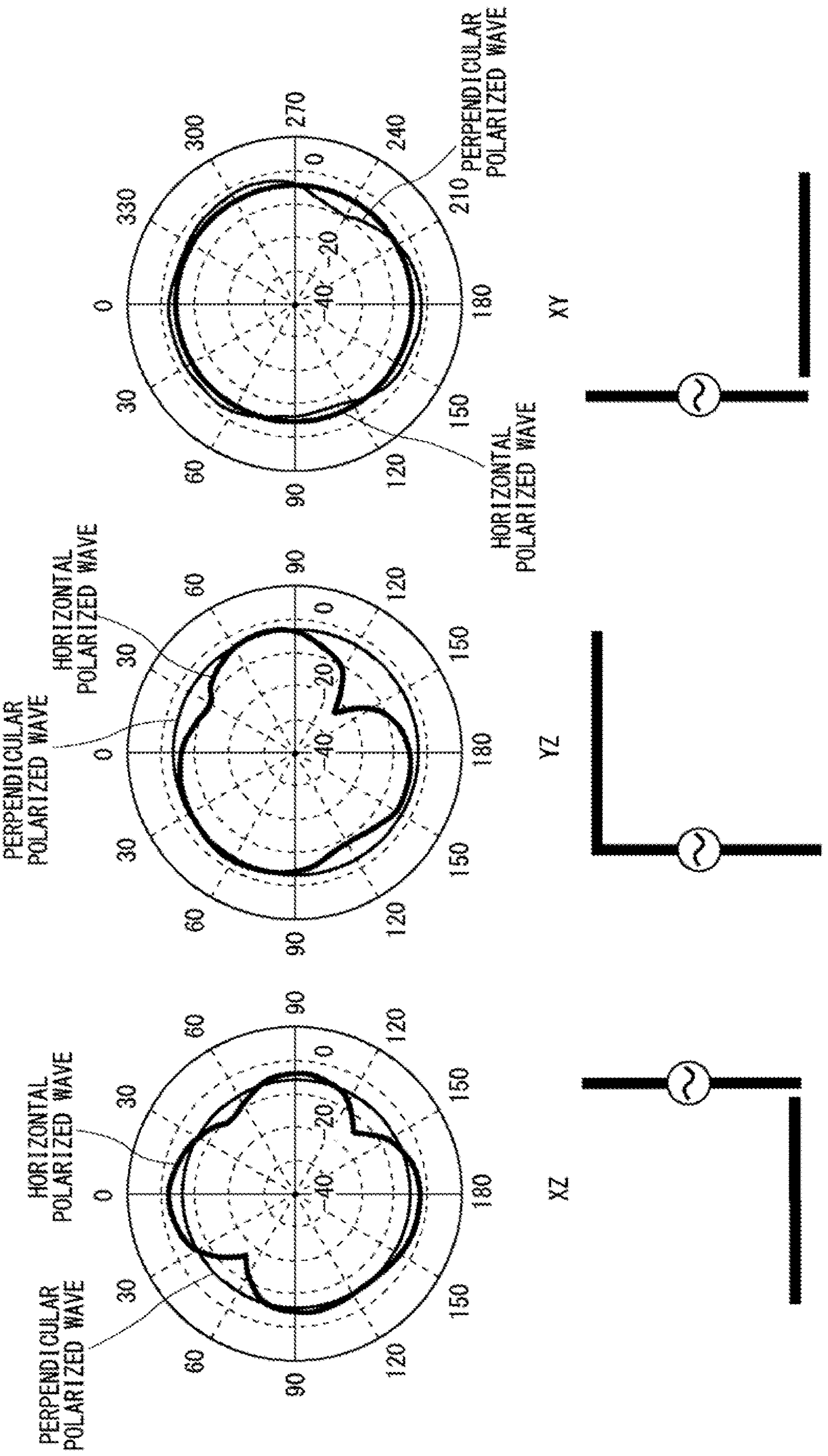
FIG. 20 is a pattern diagram illustrating the antenna radiation patterns of the antenna illustrated in FIG. 19.

As the antenna 11G illustrated in FIG. 19, even in a case where the second half-wavelength element 2 and the third half-wavelength element 3 are arranged in a non-contact state, as illustrated in a pattern diagram of FIG. 20, in the antenna radiation patterns, the polarized waves of the wireless electric wave are present in each plane of the three planes of the XZ plane, YZ plane, and XY plane. Note that in FIG. 20, the characteristic curves of the horizontal polarized wave are illustrated by thick lines, and the characteristic curves of the perpendicular polarized wave are illustrated by thin lines. FIG. 20 is the pattern diagram illustrating the antenna radiation patterns of the antenna 11G illustrated in FIG. 19 (that is, the 1.5-wavelength twisted Z-shaped non-contact three-orthogonal dipole antenna). It may be understood that the antenna 11G illustrated in FIG. 19 uniformly emits the wireless electric wave in all directions. Note that even if the first half-wavelength element 1 and the second half-wavelength element 2 are caused to become a non-contact state instead of causing the second half-wavelength element 2 and the third half-wavelength element 3 to become a non-contact state as in the case of the antenna 11G of FIG. 19, although the antenna radiation patterns are changed in shapes, the polarized waves of the wireless electric wave are present in each plane of the three planes of the XZ plane, YZ plane, and XY plane as well.

Figure 21:
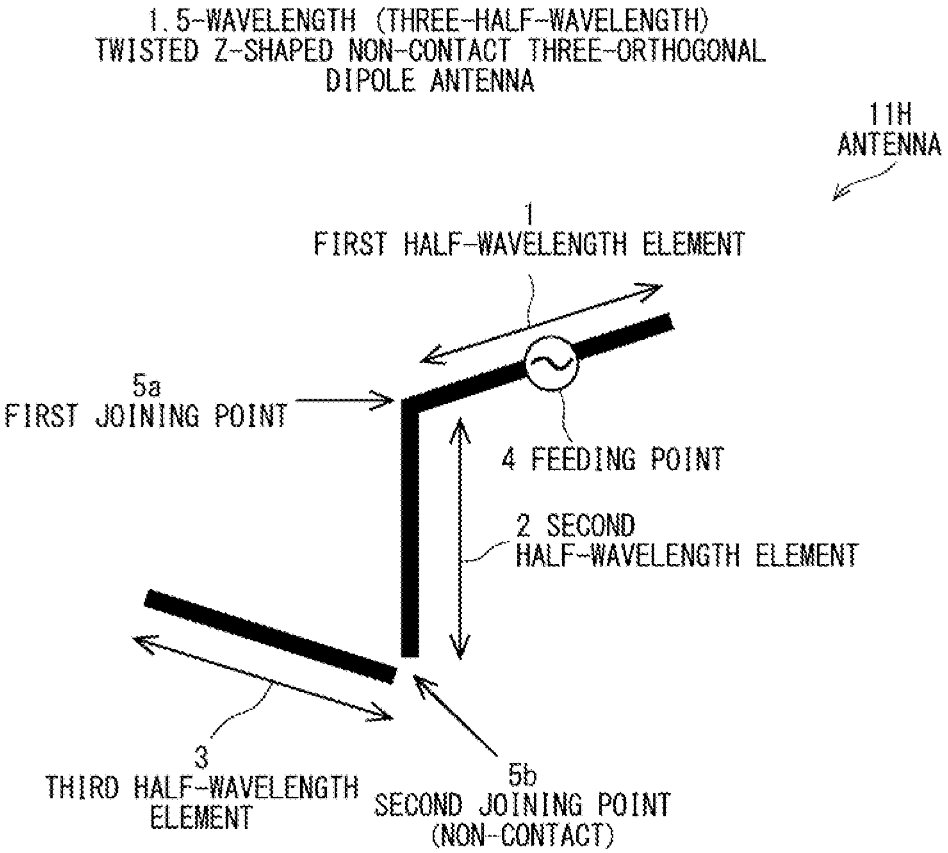
FIG. 21 is a schematic diagram illustrating an antenna configuration example of the 1.5-wavelength twisted Z-shaped three-orthogonal dipole antenna as one example of the antenna according to the example embodiment, the antenna configuration example being different from those of the antennas of FIG. 13, FIG. 15, FIG. 17, and FIG. 19.

Next, a description will be made by using FIG. 21 about an antenna configuration example of the 1.5-wavelength twisted Z-shaped three-orthogonal dipole antenna, the antenna configuration example being different from those of the antenna 11D of FIG. 13, the antenna 11E of FIG. 15, the antenna 11F of FIG. 17, and the antenna 11G of FIG. 19. FIG. 21 is a schematic diagram illustrating the antenna configuration example of the 1.5-wavelength twisted Z-shaped three-orthogonal dipole antenna as one example of the antenna according to the present example embodiment, the antenna configuration example being different from those of the antenna 11D of FIG. 13, the antenna 11E of FIG. 15, the antenna 11F of FIG. 17, and the antenna 11G of FIG. 19.

An antenna 11H illustrated in FIG. 21 depicts an example where the point that in the second joining point 5*b*, the respective end portions of the second half-wavelength element 2 and the third half-wavelength element 3 are arranged in a mutually adjacent state and in a non-contact state is different from the antenna 11E of FIG. 15. In other words, the antenna 11H of FIG. 21 depicts an example where although the arrangement position of the feeding point 4 is different from the case of the antenna 11G of FIG. 19, similarly to the case of the antenna 11G of FIG. 19, the "1.5-wavelength twisted Z-shaped three-orthogonal dipole antenna" is configured as a "1.5-wavelength twisted Z-shaped non-contact three-orthogonal dipole antenna" in which some of the half-wavelength elements are in a non-contact state. Also in the antenna 11H of FIG. 21, the second half-wavelength element 2 and the third half-wavelength element 3 are arranged in a non-contact state, and as described above, the antenna can thereby easily be installed on the substrate.

Figure 22:
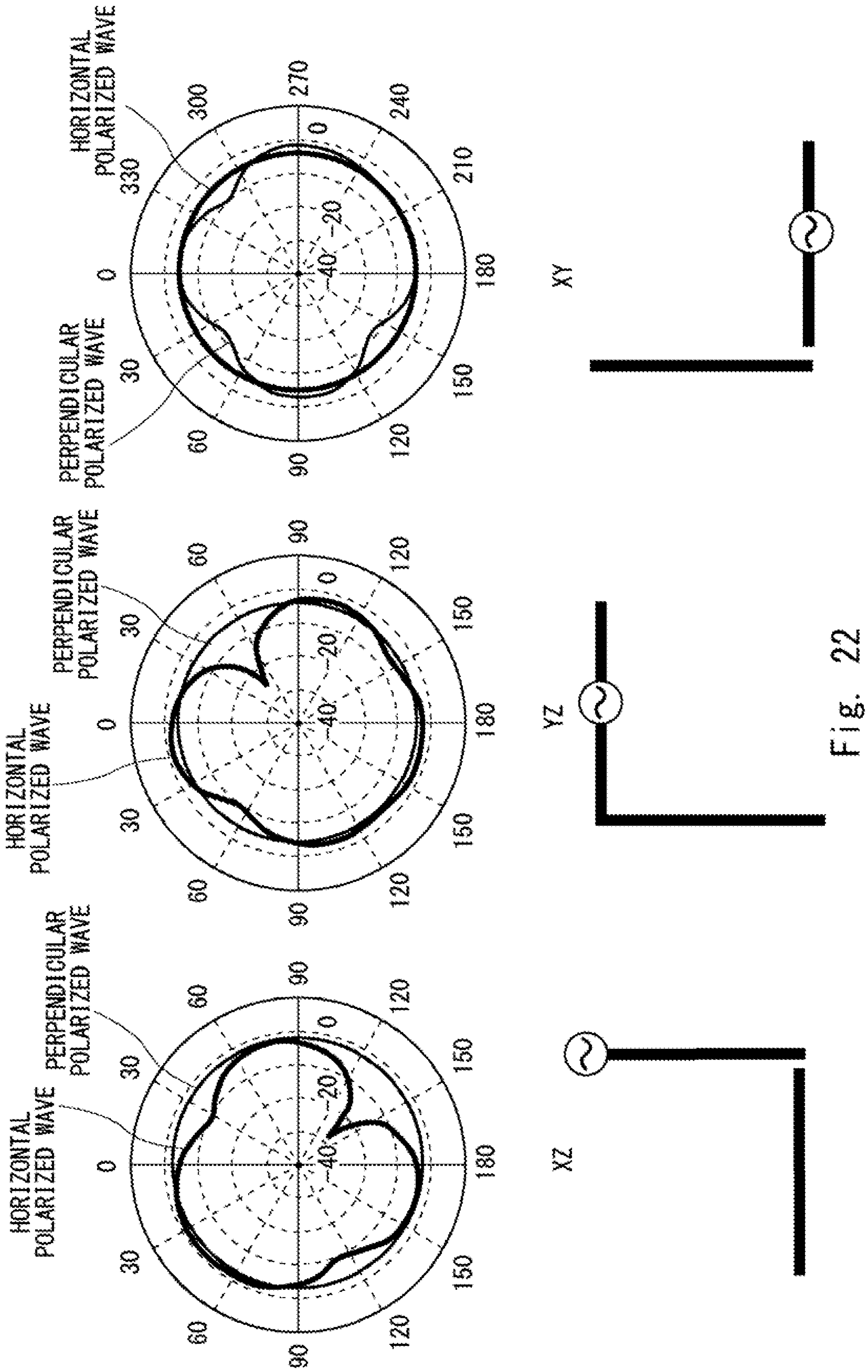
FIG. 22 is a pattern diagram illustrating the antenna radiation patterns of the antenna illustrated in FIG. 21.

Further, as the antenna 11H illustrated in FIG. 21, even in a case where the second half-wavelength element 2 and the third half-wavelength element 3 are arranged in a non-contact state, similarly to the antenna 11G of FIG. 19, as illustrated in a pattern diagram of FIG. 22, in the antenna radiation patterns, the polarized waves of the wireless electric wave are present in each plane of the three planes of the XZ plane, YZ plane, and XY plane. Note that in FIG. 22, the characteristic curves of the horizontal polarized wave are illustrated by thick lines, and the characteristic curves of the perpendicular polarized wave are illustrated by thin lines. FIG. 22 is the pattern diagram illustrating the antenna radiation patterns of the antenna 11H illustrated in FIG. 21 (that is, the 1.5-wavelength twisted Z-shaped non-contact three-orthogonal dipole antenna). It may be understood that the antenna 11H illustrated in FIG. 21 uniformly emits the wireless electric wave in all directions.

Figure 23:
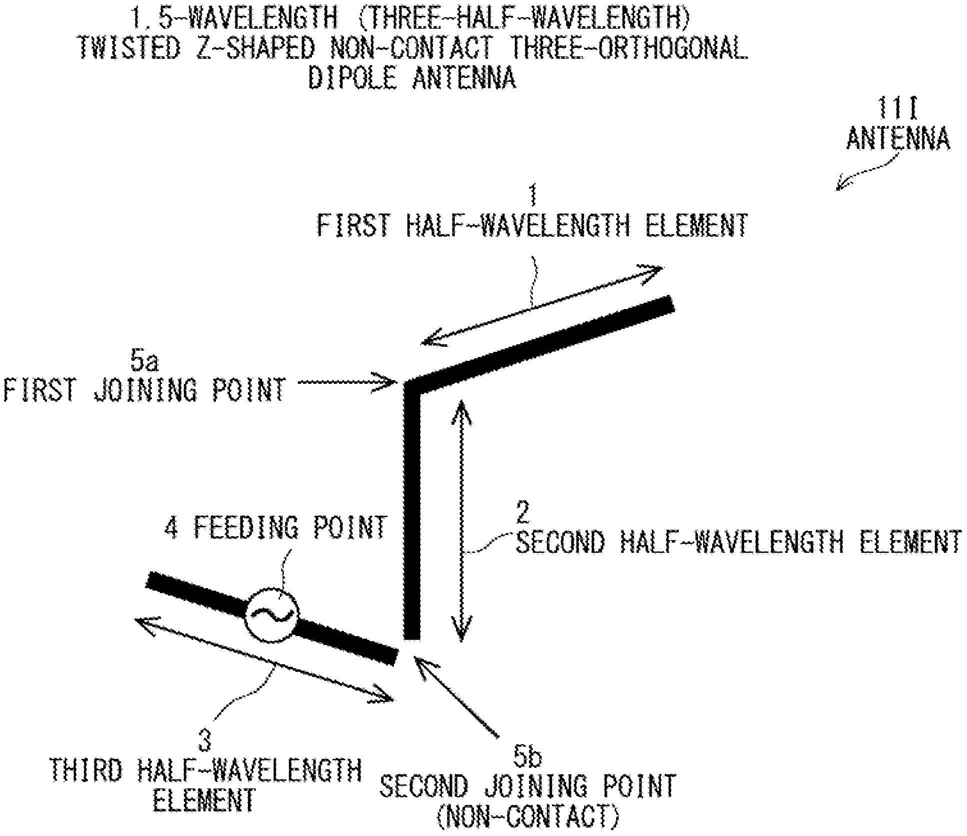
FIG. 23 is a schematic diagram illustrating an antenna configuration example of the 1.5-wavelength twisted Z-shaped three-orthogonal dipole antenna as one example of the antenna according to the example embodiment, the antenna configuration example being different from those of the antennas of FIG. 13, FIG. 15, FIG. 17, FIG. 19, and FIG. 21.

Next, a description will be made by using FIG. 23 about an antenna configuration example of the 1.5-wavelength twisted Z-shaped three-orthogonal dipole antenna, the antenna configuration example being different those of from the antenna 11D of FIG. 13, the antenna 11E of FIG. 15, the antenna 11F of FIG. 17, the antenna 11G of FIG. 19, and the antenna 11H of FIG. 21. FIG. 23 is a schematic diagram illustrating the antenna configuration example of the 1.5-wavelength twisted Z-shaped three-orthogonal dipole antenna as one example of the antenna according to the present example embodiment, the antenna configuration example being different from those of the antenna 11D of FIG. 13, the antenna 11E of FIG. 15, the antenna 11F of FIG. 17, the antenna 11G of FIG. 19, and the antenna 11H of FIG. 21.

An antenna 11I illustrated in FIG. 23 depicts an example where the point that the arrangement position of the feeding point 4 is arranged at the center of the third half-wavelength element 3 in a non-contact state with the other half-wavelength elements is different from the antenna 11G of FIG. 19 and the antenna H of FIG. 21. In other words, the antenna 11I of FIG. 23 depicts an example where although the arrangement position of the feeding point 4 is different from the cases of the antenna 11G of FIG. 19 and the antenna 11H of FIG. 21, similarly to the cases of the antenna 11G of FIG. 19 and the antenna 11H of FIG. 21, the "1.5-wavelength twisted Z-shaped three-orthogonal dipole antenna" is configured as a "1.5-wavelength twisted Z-shaped non-contact three-orthogonal dipole antenna" in which some of the half-wavelength elements are in a non-contact state. That is, a case of the antenna 11I of FIG. 23 depicts a case where the other end portion of the second half-wavelength element 2 is not joined to the one end portion of the third half-wavelength element 3 but the other end portion of the second half-wavelength element 2 and the one end portion of the third half-wavelength element 3 are arranged in a non-contact state in mutually adjacent positions; the position of the feeding point 4 is arranged not in the central position of the second half-wavelength element 2 or the first half-wavelength element 1 but in the central position of the third half-wavelength element 3 in a non-contact state with the other half-wavelength elements; and the "1.5-wavelength twisted Z-shaped non-contact three-orthogonal dipole antenna" is thereby formed.

Figure 24:
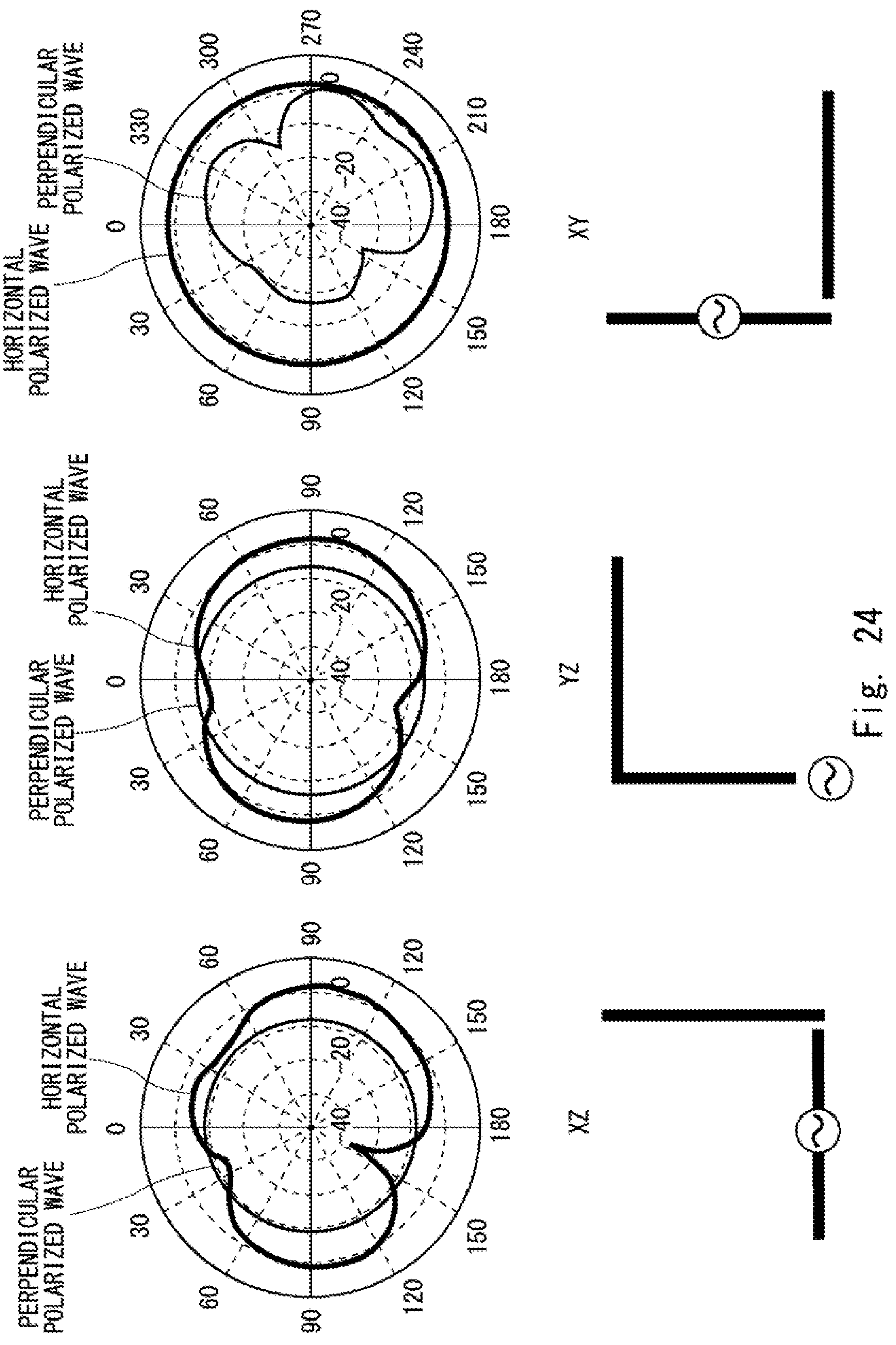
FIG. 24 is a pattern diagram illustrating the antenna radiation patterns of the antenna illustrated in FIG. 23.

As the antenna 11I illustrated in FIG. 23, even in a case where the feeding point 4 is arranged at the center of the third half-wavelength element 3 in a non-contact state with the other half-wavelength elements, similarly to the cases of the antenna 11G of FIG. 19 and the antenna 11H of FIG. 21, as illustrated in a pattern diagram of FIG. 24, in the antenna radiation patterns, the polarized waves of the wireless electric wave are present in each plane of the three planes of the XZ plane, YZ plane, and XY plane. Note that in FIG. 24, the characteristic curves of the horizontal polarized wave are illustrated by thick lines, and the characteristic curves of the perpendicular polarized wave are illustrated by thin lines. FIG. 24 is the pattern diagram illustrating the antenna radiation patterns of the antenna 11I illustrated in FIG. 23 (that is, the 1.5-wavelength twisted Z-shaped non-contact three-orthogonal dipole antenna). It may be understood that the antenna 11I illustrated in FIG. 23 uniformly emits the wireless electric wave in all directions.

Next, a description will be made by using FIG. 25 about a configuration example of a wireless communication apparatus in which the antenna 11I illustrated in FIG. 23 as one example of the present example embodiment is installed as one example of the wireless communication apparatus according to the present example embodiment. Here, the wireless communication apparatus of FIG. 25 will be described by using, as an example, a case of a home router similar to the home router 10L illustrated in FIG. 31A and FIG. 31B as related art.

Figure 25:
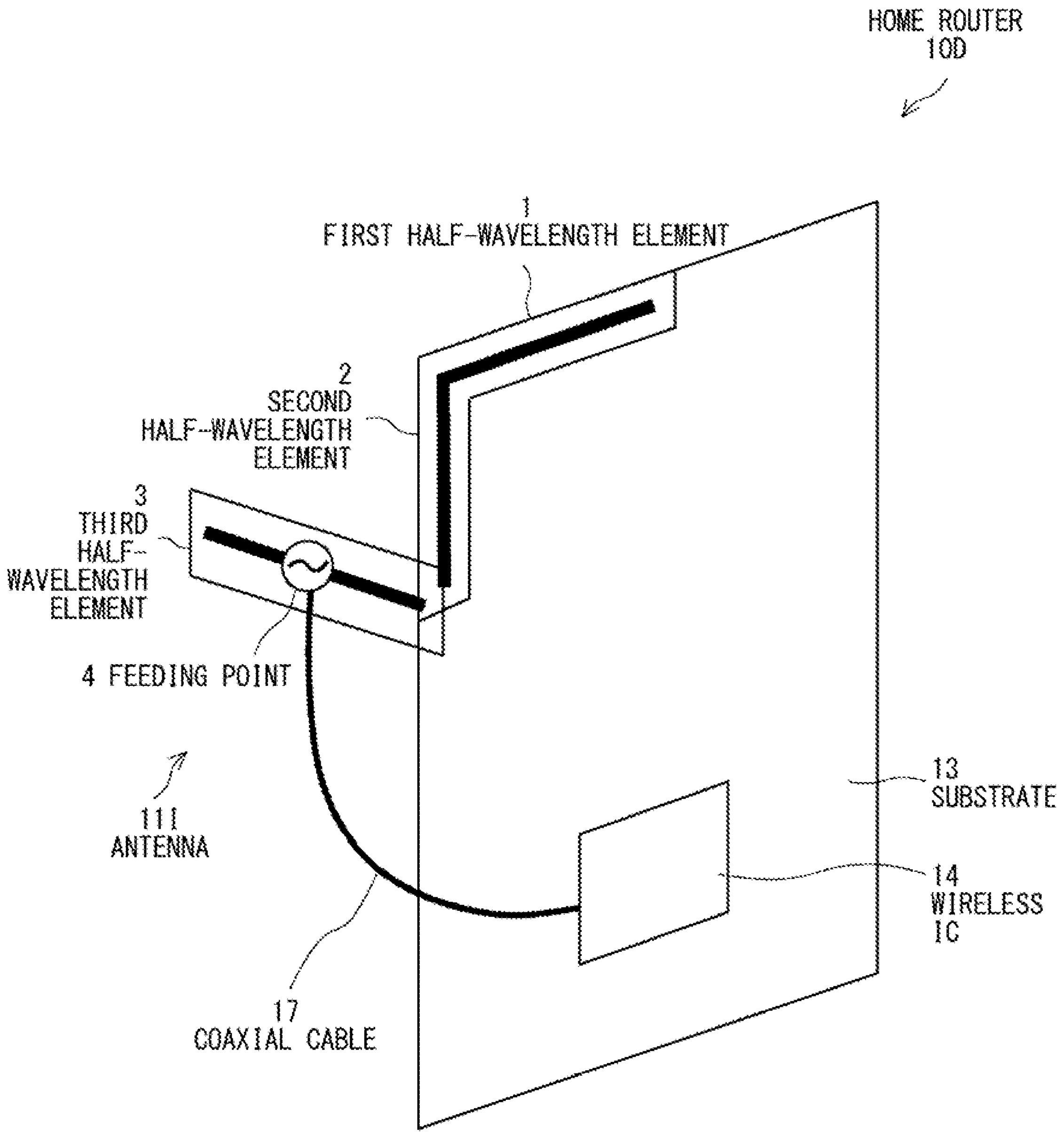
FIG. 25 is a perspective view illustrating one example of an antenna configuration of a home router using the antenna illustrated in FIG. 23 as one example of the example embodiment.

FIG. 25 is a perspective view illustrating one example of an antenna configuration of a home router using the antenna 11I illustrated in FIG. 23 as one example of the present example embodiment and illustrates one example of an antenna configuration mounted on an internal portion of the home router.

As illustrated in FIG. 25, in a home router 10D of FIG. 25, the wireless IC (integrated circuit) 14 for performing power feeding to the antenna 11I is installed on the substrate 13, and the wireless IC 14 is connected with the feeding point 4 arranged at the center of the third half-wavelength element 3 via the coaxial cable 17. By using the coaxial cable 17, power can be fed from the wireless IC 14 to the feeding point 4 of the antenna 11I while loss of signal power is reduced.

In addition, as illustrated in FIG. 25, the home router 10D of FIG. 25 is configured such that the first half-wavelength element 1 and the second half-wavelength element 2 of the antenna 11I are directly installed, in an L-shape, on the substrate 13 in which the wireless IC 14 is installed. In other words, in a case where there is room in the component mounting space on the substrate 13, when the first half-wavelength element 1 and the second half-wavelength element 2 of the antenna 11I are directly installed, in an L-shape, on the substrate 13, size reduction of a dedicated mounting substrate for the antenna 11I becomes possible, and cost reduction can be intended. In this case, as described above, the antenna 11I is formed as the "1.5-wavelength twisted Z-shaped non-contact three-orthogonal dipole antenna" in which the second half-wavelength element 2 is in a non-contact state with the third half-wavelength element 3. Consequently, it becomes easy to perform pattern drawing of the first half-wavelength element 1 and the second half-wavelength element 2 on the substrate 13, and costs can further be reduced. In addition, the third half-wavelength element 3 in an orthogonal state to the first half-wavelength element 1 and the second half-wavelength element 2 on the substrate 13 is caused to become a non-contact state, the third half-wavelength element 3 can thereby easily be arranged on the outside of the substrate 13, and the three-orthogonal state of the antenna 11I can easily be formed.

Figure 26:
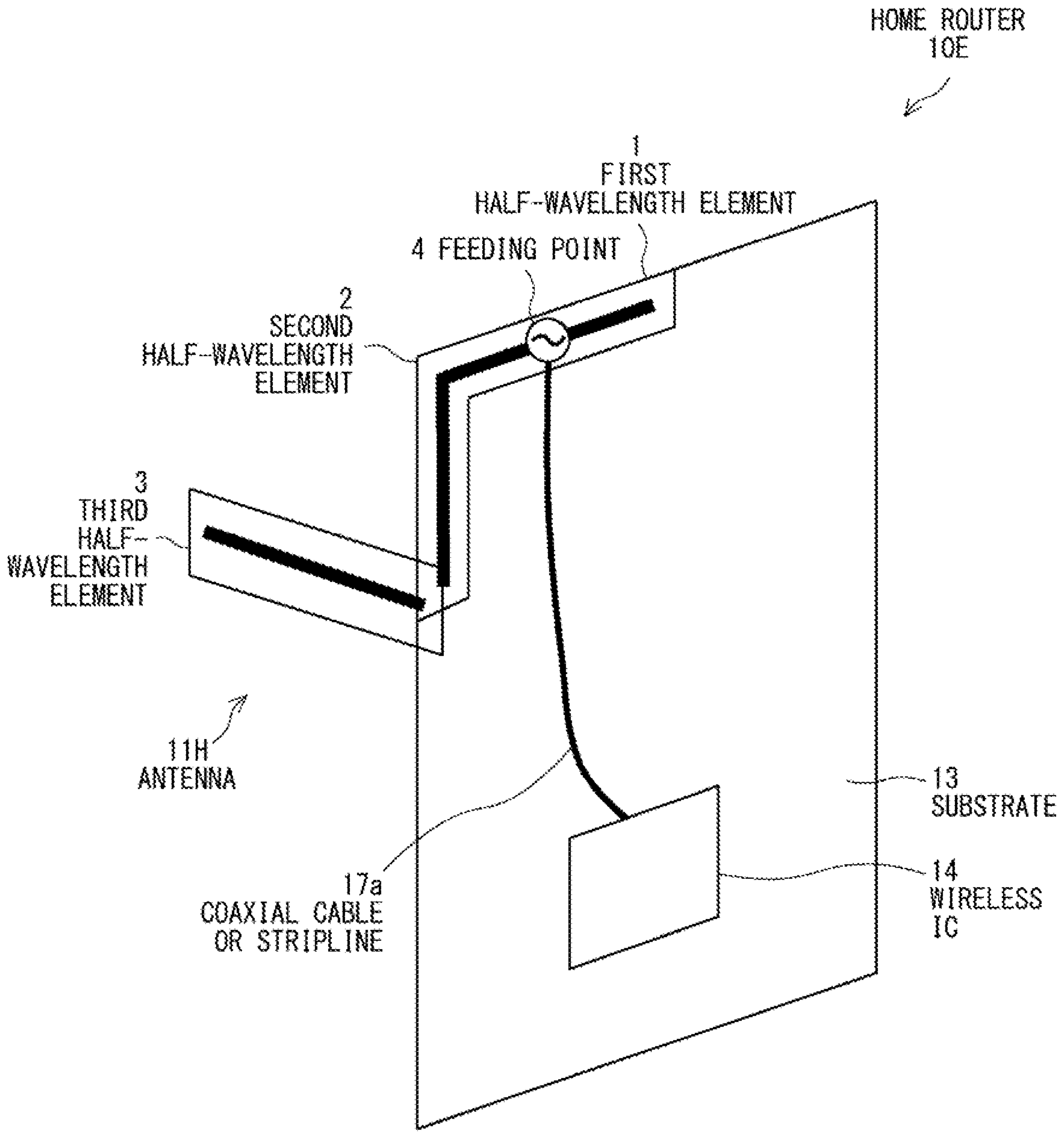
FIG. 26 is a perspective view illustrating one example of an antenna configuration of a home router using the antenna illustrated in FIG. 21 as one example of the example embodiment.

Further, FIG. 26 is a perspective view illustrating one example of an antenna configuration of a home router using the antenna 11H illustrated in FIG. 21 as one example of the present example embodiment. A home router 10E of FIG. 26 depicts a case where although the elements of the antenna to be directly installed on the substrate 13 in which the wireless IC 14 is installed are the first half-wavelength element 1 and the second half-wavelength element of the antenna 11H similarly to a case of the home router 10D of FIG. 25, the feeding point 4 is arranged in the first half-wavelength element 1 differently from the case of the home router 10D of FIG. 25.

That is, in the home router 10E of FIG. 26, a connection medium which connects the feeding point 4 arranged at the center of the first half-wavelength element 1 of the antenna 11H with the wireless IC 14 is a coaxial cable or stripline 17*a*. When pattern drawing of not the coaxial cable but the stripline is performed on the substrate 13, further cost reduction can be intended.

Description of Effects of Present Example Embodiment

As described in detail above, the present example embodiment can provide the following effects.

That is, three elements configuring a dipole antenna are caused to be in three-orthogonal arrangement, and it thereby becomes possible to realize an improvement in polarized waves of a wireless electric wave, the improvement being very necessary for an improvement in wireless communication performance.

In addition, a structure is employed in which one or more elements among the three elements are caused to become a non-contact state with the other elements, and it thereby becomes possible to easily install one or more elements on the substrate 13 in which a component such as the wireless IC 14 for power supply to the antenna is installed. Thus, it is possible to inexpensively and simply realize an antenna which is capable of improving wireless communication performance.

Other Examples of Present Example Embodiment

In the above-described example embodiment, a description is made about a case of the one-wavelength twisted Z-shaped three-orthogonal dipole antenna or the 1.5-wavelength twisted Z-shaped three-orthogonal dipole antenna in which the whole length of the dipole antenna is set to 1 wavelength or 1.5 wavelengths; however, the present example embodiment is not limited to such a case. For example, the dipole antenna may be configured as a half-wavelength twisted Z-shaped three-orthogonal dipole antenna in which the whole length of the dipole antenna is set to a half-wavelength. Note that in the following descriptions, a description will be made about a case where the antenna is placed in a perpendicular direction to the ground (XY plane).

(Half-Wavelength Twisted Z-Shaped Three-Orthogonal Dipole Antenna)

Figure 27:
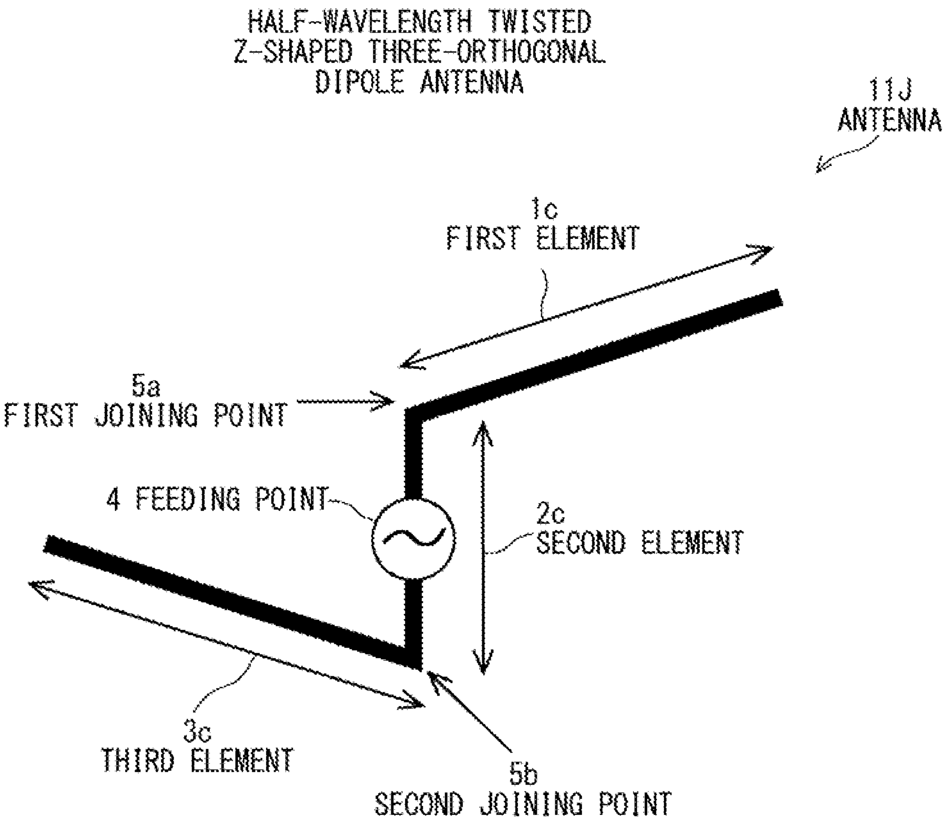
FIG. 27 is a schematic diagram illustrating one example of an antenna configuration of a half-wavelength twisted Z-shaped three-orthogonal dipole antenna as one example of an antenna according to the example embodiment.

FIG. 27 is a schematic diagram illustrating one example of an antenna configuration of the half-wavelength twisted Z-shaped three-orthogonal dipole antenna as one example of the antenna according to the present example embodiment. As illustrated in FIG. 27, in an antenna 11J, an element with a length of a half-wavelength is bent in two parts, at a right angle, and in mutually orthogonal directions and is thereby formed as a first element 1*c*, a second element 2*c*, and a third element 3*c*. Consequently, the first element 1*c*, the second element 2*c*, and the third element 3*c* are in a three-orthogonal positional relationship. Further, end portions of the first element 1*c* and the second element 2*c* and end portions of the second element 2*c* and the third element 3*c* are respectively connected and contact with each other in the first joining point 5*a* and the second joining point 5*b*.

Here, the respective lengths of the first element 1*c*, the second element 2*c*, and the third element 3*c* are in the following relationship.

(First element 1*c*)=(third element 3*c*)>(second element 2*c*)

In other words, the elements are in a relationship in which the lengths of the first element 1*c* and the third element 3*c* are equivalent to each other and are longer than the length of the second element 2*c*. Further, the feeding point 4 for antenna power feeding where the antenna 11J starts is arranged at the center of the second element 2*c*.

As a result, the antenna 11J of FIG. 27 is formed as the "half-wavelength twisted Z-shaped three-orthogonal dipole antenna". The whole length of the antenna 11J is a half-wavelength and is shorter than the above-described "one-wavelength twisted Z-shaped three-orthogonal dipole antenna" and "1.5-wavelength twisted Z-shaped three-orthogonal dipole antenna", and the antenna 11J can be made compact.

In other words, in the antenna 11J illustrated in FIG. 27, the three elements of the first element 1*c*, the second element 2*c*, and the third element 3*c* whose total length becomes a length of a half-wavelength at an arbitrary frequency designated in advance are arranged in the three-orthogonal state where those are orthogonal to each other. Furthermore, the lengths of the first element 1*c* and the third element 3*c* are set equivalent to each other and are set longer than the length of the second element 2*c*. Furthermore, one end portion of the first element 1*c* is joined to one end portion of the second element 2*c*, and the other end portion of the second element 2*c* is joined to one end portion of the third element 3*c*. In addition, the feeding point 4 for antenna power feeding is arranged in the central position of the second element 2*c*, and the "half-wavelength twisted Z-shaped three-orthogonal dipole antenna" is thereby formed.

However, a case of the "half-wavelength twisted Z-shaped three-orthogonal dipole antenna" as the antenna 11J of FIG. 27 is different from the "one-wavelength twisted Z-shaped three-orthogonal dipole antenna" and the "1.5-wavelength twisted Z-shaped three-orthogonal dipole antenna" and has a disadvantage of being incapable of causing any one or all of the portions between the first element 1*c* and the second element 2*c* and between the second element 2*c* and the third element 3*c* to become a non-contact state. As one reason, in the cases of the "one-wavelength twisted Z-shaped three-orthogonal dipole antenna" and the "1.5-wavelength twisted Z-shaped three-orthogonal dipole antenna", even if an element fed with no power is present, the element can provide a function as an antenna as the half-wavelength element or the (¼) wavelength element. On the other hand, in the case of the "half-wavelength twisted Z-shaped three-orthogonal dipole antenna", because the length of each of the elements is short, the element does not function as an antenna in a state where no power is fed.

Figure 28:
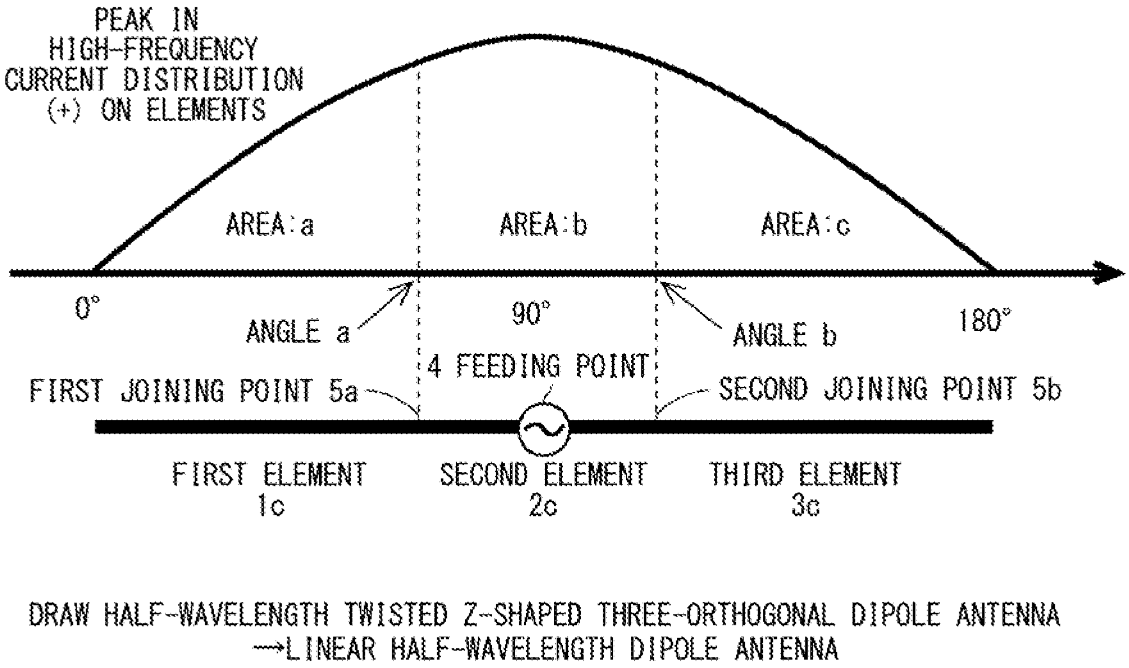
FIG. 28 is a schematic diagram illustrating one example of an evaluation factor for determining the length of each element of the antenna illustrated in FIG. 27.

FIG. 28 is a schematic diagram illustrating one example of an evaluation factor for determining the length of each of the elements of the antenna 11J illustrated in FIG. 27 and illustrates an example where the length of each of the elements is determined based on high-frequency current distribution on each of the elements. FIG. 28 illustrates a case where the elements of the antenna 11J in the three-orthogonal state are drawn and thereby caused to form a linear half-wavelength dipole antenna and lengths of the half-wavelength dipole antenna are expressed by angles of 0° to 180°. Furthermore, FIG. 28 illustrates a condition of the high-frequency current distribution (theoretically, sine wave distribution) in a case where high-frequency power feeding is performed from the feeding point 4 arranged in the central position of the half-wavelength dipole antenna in a drawn state.

Here, for example, when the angles that divide the area of the high-frequency current distribution into three equal parts are obtained in a high-frequency current distribution curve in FIG. 28, the optimal bending positions for forming the half-wavelength twisted Z-shaped three-orthogonal dipole antenna can be obtained. In other words, the area of the high-frequency current distribution in FIG. 28 indicates the intensity of the high-frequency current, and the high-frequency current is a source of the wireless electric wave to be emitted from the antenna. Thus, when the area of the high-frequency current distribution is divided into three equal parts, it becomes possible to radiate the wireless electric wave at an equivalent intensity with respect to each of three planes in the three-orthogonal state.

Consequently, as illustrated in FIG. 28, given that the areas of three regions resulting from division of the current distribution curve in FIG. 28 are set as a, b, and c, when the respective positions of an angle a and an angle b are obtained as angular positions which divide the area of the high-frequency current distribution into three equal parts such that the relationship of a=b=c holds, the angle a can be determined as the bending position for the first joining point 5*a*, and the angle b can be determined as the bending position for the second joining point 5*b*. Experimentally, results have been obtained that the angle a is approximately 60° to 80° and the angle b is approximately 100° to 120°.

When the half-wavelength dipole antenna with a length of a half-wavelength is bent at a right angle and in mutually orthogonal directions in the respective positions of the first joining point 5*a* and the second joining point 5*b* which are determined based on the evaluation in FIG. 28, as the antenna 11J illustrated in FIG. 27 and formed with the first element 1*c*, the second element 2*c*, and the third element 3*c*, an optimal "half-wavelength twisted Z-shaped three-orthogonal dipole antenna" can be formed.

Figure 29:
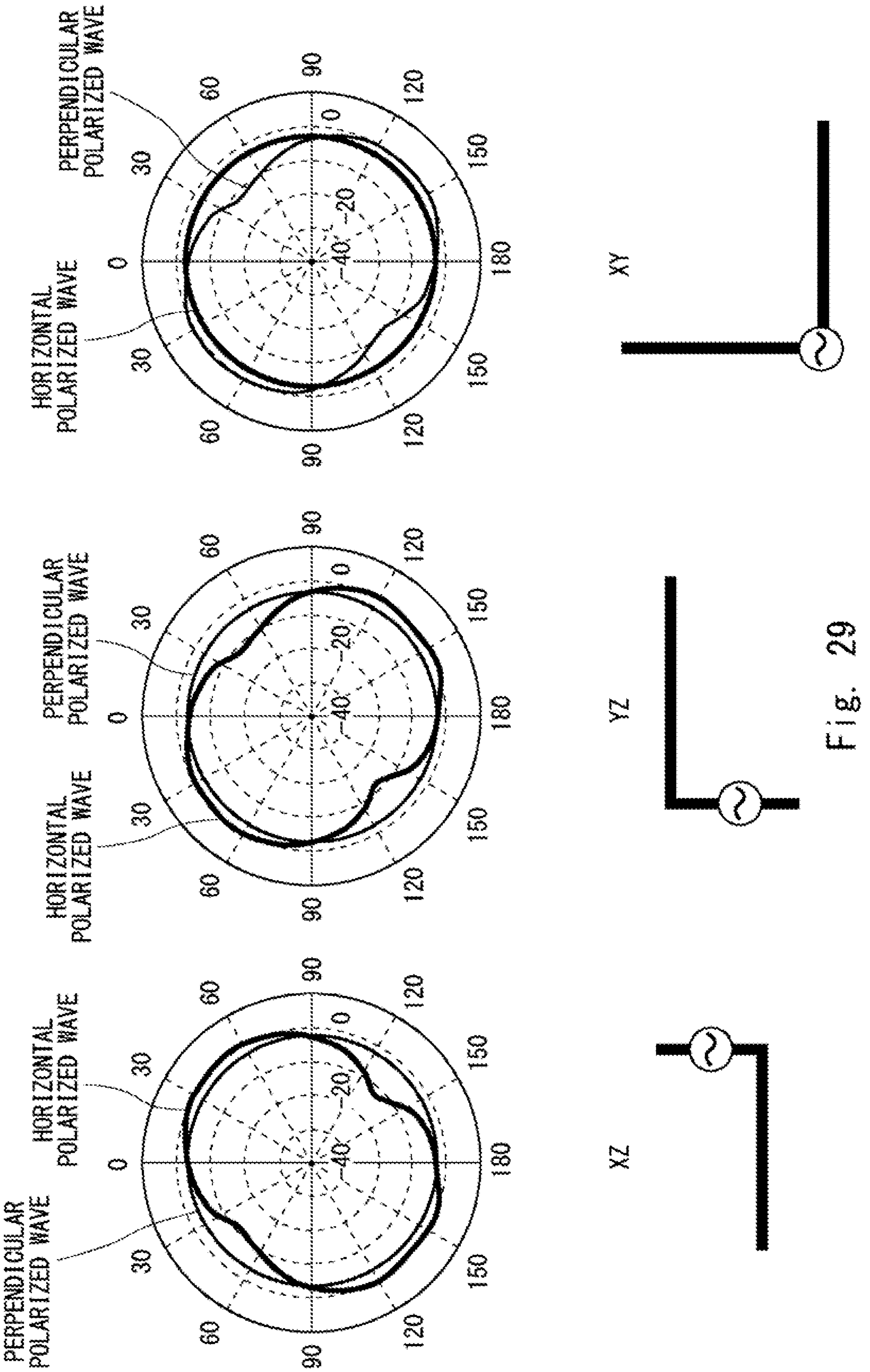
FIG. 29 is a pattern diagram illustrating the antenna radiation patterns of the antenna illustrated in FIG. 27.
Figure 30A:
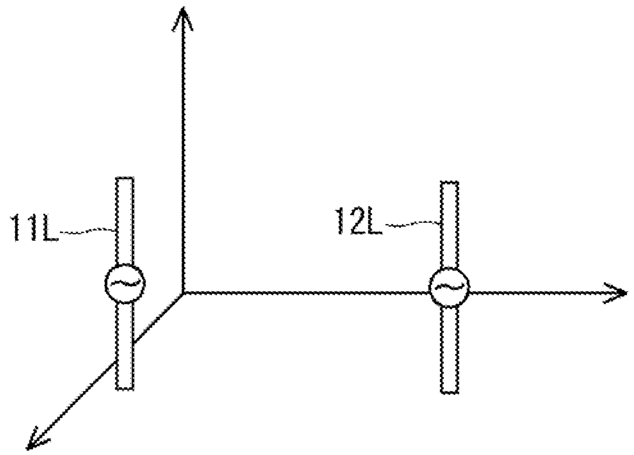
FIG. 30A is a conceptual diagram illustrating an agreement state of polarized waves of wireless electric waves between two common dipole antennas.
Figure 30B:
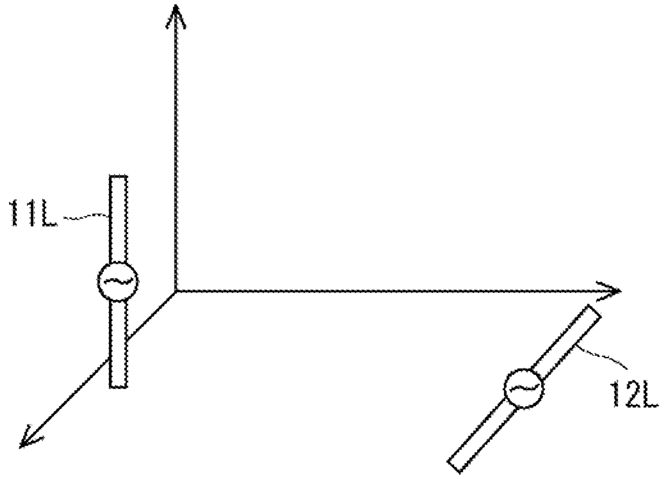
FIG. 30B is a conceptual diagram illustrating a disagreement state of polarized waves of wireless electric waves between the two common dipole antennas.
Figure 32A:
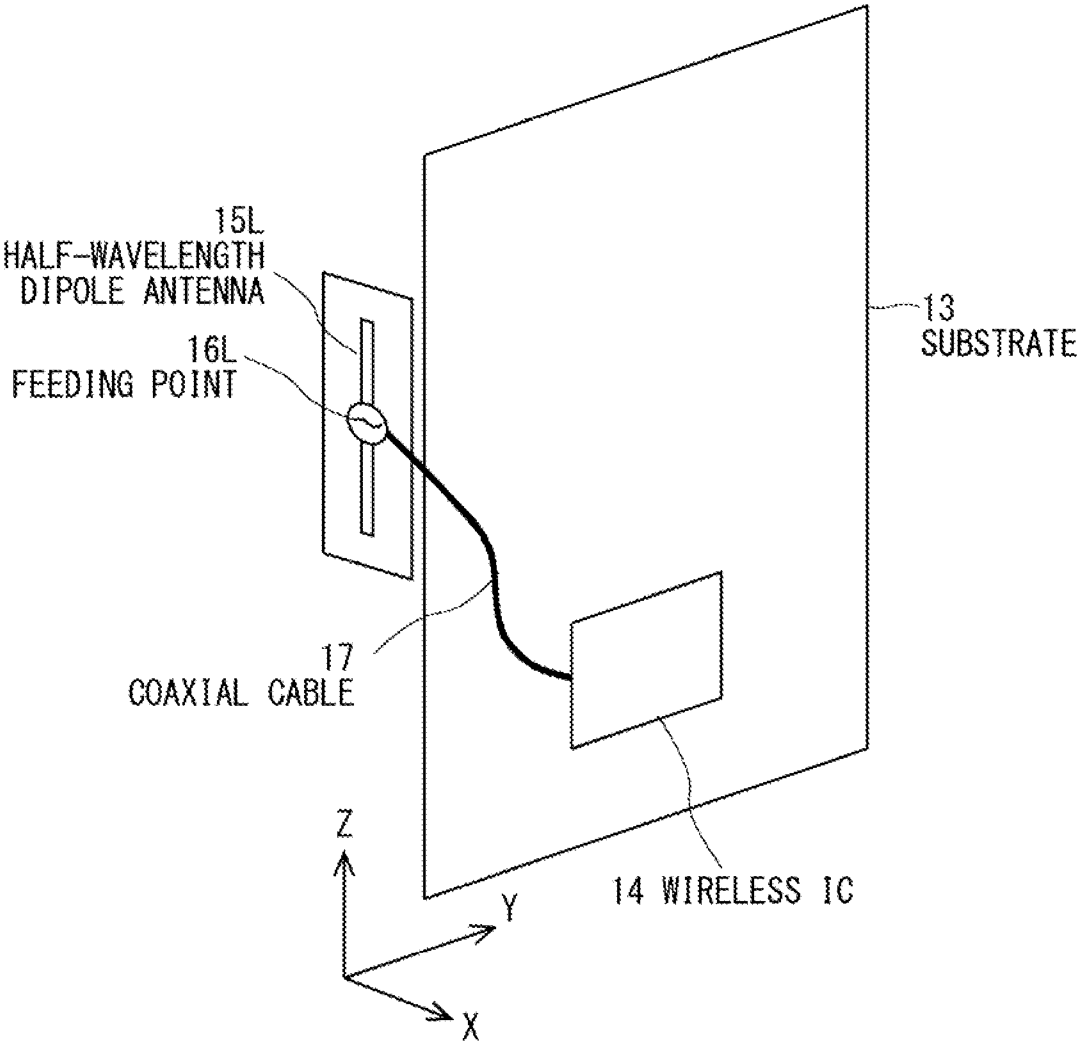
FIG. 32A is a schematic diagram illustrating a setting state of X axis, Y axis, and Z axis in a case of expressing the antenna radiation patterns of a half-wavelength dipole antenna of the home router illustrated in FIG. 31A and FIG. 31B.
Figure 32B:
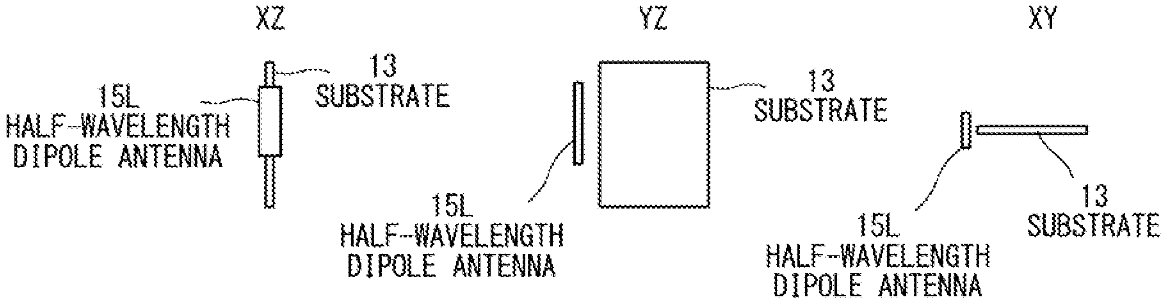
FIG. 32B is a schematic diagram illustrating the setting state of the X axis, Y axis, and Z axis in a case of expressing the antenna radiation patterns of the half-wavelength dipole antenna of the home router illustrated in FIG. 31A and FIG. 31B.

FIG. 29 is a pattern diagram illustrating the antenna radiation patterns of the antenna 11J illustrated in FIG. 27 (that is, the half-wavelength twisted Z-shaped three-orthogonal dipole antenna) and illustrates the antenna radiation patterns of the antenna 11J in each of the XZ plane, YZ plane, and XY plane. Note that the characteristic curves of the horizontal polarized wave are illustrated by thick lines, and the characteristic curves of the perpendicular polarized wave are illustrated by thin lines. As illustrated in the pattern diagram of FIG. 29, as for the antenna 11J illustrated in FIG. 27, the polarized waves of the wireless electric wave are present in each plane of the three planes of the XZ plane, YZ plane, and XY plane. It may be understood that differently from the antenna radiation patterns (FIG. 33) of the half-wavelength dipole antenna 15L illustrated in FIG. 32A and FIG. 32B as related art, the antenna 11J illustrated in FIG. 27 uniformly emits the wireless electric wave in all directions. In addition, as illustrated in the antenna radiation patterns in FIG. 29, focusing on the perpendicular polarized wave in each plane of the XZ plane, YZ plane, and XY plane, it may be understood that the polarized wave at an almost equivalent intensity can be obtained in each of the planes and the balance among the lengths of the elements of the antenna 11J is appropriate.

In the foregoing, the preferable example embodiments of the invention of the present application have been described. However, it should be noted that such example embodiments are merely illustrative of the invention of the present application and do not limit the invention of the present application at all. A person skilled in the art would be able to understand that various modifications and changes are possible in accordance with specific usages without departing from the gist of the present invention.

In other words, the invention of the present application has been described by referring to example embodiments; however, the invention of the present application is not limited by the above example embodiments, and various changes that a person skilled in the art would be able to understand may be applied to configurations and details of the invention of the present application within the scope of the invention.

The present application claims priority based on Japanese Patent Application No. 2018-212048, filed on Nov. 12, 2018, the entirety of which is incorporated herein by reference.

REFERENCE SIGNS LIST

1 first half-wavelength element
1*a* first (¼) wavelength element
1*b* second (¼) wavelength element
1*c* first element
2 second half-wavelength element
2*c* second element
3 third half-wavelength element
3*c* third element
4 feeding point
5 joining point
5*a* first joining point
5*b* second joining point
10 home router
10A home router
10B home router
10C home router
10D home router
10E home router
10L home router
11 antenna
11A antenna
11B antenna
11C antenna
11D antenna
11E antenna
11F antenna
11G antenna
11H antenna
11I antenna
11J antenna
11L antenna
12L antenna
13 substrate
14 wireless IC
15L half-wavelength dipole antenna
16L feeding point
17 coaxial cable
17*a* coaxial cable or stripline
18 housing

What is claimed is:

1. An antenna comprising:

first quarter-wavelength element and a second quarter-wavelength element that each have a length of quarter-wavelength at an arbitrary frequency designated in advance; and a half-wavelength element that has a length of a half-wavelength at the arbitrary frequency, wherein the first quarter-wavelength element, the second quarter-wavelength element, and the half-wavelength element are arranged in a three-orthogonal state in which the first quarter-wavelength element, the second quarter-wavelength element, and the half-wavelength elements are orthogonal to each other, an end portion of the first quarter-wavelength element is joined to one a first end portion of the second quarter-wavelength element, a second end portion of the second quarter-wavelength element is joined to an end portion of the half-wavelength element, a feeding point for antenna power feeding is arranged in a position in which the end portion of the first quarter-wavelength element is joined to the first end portion of the second quarter-wavelength element, and the antenna is formed as a one-wavelength twisted Z-shaped three-orthogonal dipole antenna.

2. The antenna according to claim 1, wherein a position of the feeding point is not arranged in the position in which the end portion of the first quarter-wavelength element is joined to the first end portion of the second quarter-wavelength element but in a central position of the half-wavelength element, and the antenna is formed as the one-wavelength twisted Z-shaped three-orthogonal dipole antenna.

3. The antenna according to claim 1, wherein the second end portion of the second quarter-wavelength element is not joined to the end portion of the half-wavelength element but the second end portion of the second quarter-wavelength element and the end portion of the half-wavelength element are arranged in a non-contact state in mutually adjacent positions, and the antenna is formed as the one-wavelength twisted Z-shaped non-contact three-orthogonal dipole antenna.

* * * * *